(12) United States Patent
Graf et al.

(10) Patent No.: US 9,285,234 B1
(45) Date of Patent: Mar. 15, 2016

(54) AUTOMATIC DISPLAY OF TRIP INFORMATION IN A MAPPING APPLICATION

(71) Applicant: GOOGLE INC., Mountain View, CA (US)

(72) Inventors: Daniel Graf, San Francisco, CA (US); Darren Delaye, San Francisco, CA (US); Rita Chen, Forest Hills, NY (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/066,335

(22) Filed: Oct. 29, 2013

Related U.S. Application Data

(60) Provisional application No. 61/732,905, filed on Dec. 3, 2012, provisional application No. 61/719,746, filed on Oct. 29, 2012.

(51) Int. Cl.
*G01C 21/36* (2006.01)

(52) U.S. Cl.
CPC .................................. *G01C 21/3614* (2013.01)

(58) Field of Classification Search
None
See application file for complete search history.

(56) References Cited

U.S. PATENT DOCUMENTS

| 6,845,316 | B2 | 1/2005 | Yates |
| 7,268,703 | B1 * | 9/2007 | Kabel et al. ................... 340/984 |
| 8,437,778 | B1 | 5/2013 | Ortega et al. |
| 8,856,671 | B2 * | 10/2014 | Halbherr et al. ............... 715/769 |
| 2001/0030667 | A1 | 10/2001 | Kelts |
| 2007/0011150 | A1 | 1/2007 | Frank |
| 2007/0060144 | A1 | 3/2007 | Mills et al. |
| 2008/0177471 | A1 | 7/2008 | Deurwaarder et al. |
| 2009/0281720 | A1 | 11/2009 | Jakobson |
| 2011/0113148 | A1 * | 5/2011 | Salmela et al. ............... 709/229 |
| 2012/0197757 | A1 | 8/2012 | Ajala |
| 2012/0254804 | A1 | 10/2012 | Sheha et al. |
| 2013/0122937 | A1 | 5/2013 | Meyer et al. |
| 2013/0253832 | A1 * | 9/2013 | Nallu et al. ................... 701/537 |
| 2013/0321240 | A1 | 12/2013 | O'Shea et al. |
| 2014/0101601 | A1 | 4/2014 | Tang |

OTHER PUBLICATIONS

"Trip Planning," (2013). Retrieved from the Internet on Nov. 18, 2013: URL:http://tripplanner2.kingcounty.gov/.
PCMAG.com, "TomTom (for iPhone)," (2013). Retrieved from the Internet on Nov. 18, 2013: URL:http://www.pcmag.com/article2/0,2817,2388770,00,asp.
U.S. Appl. No. 13/931,718, filed Jun. 28, 2013.
U.S. Appl. No. 14/066,286, filed Oct. 29, 2013.
U.S. Appl. No. 14/066,304, filed Oct. 29, 2013.

* cited by examiner

*Primary Examiner* — Rami Khatib
(74) *Attorney, Agent, or Firm* — Marshall, Gerstein & Borun LLP

(57) ABSTRACT

An interactive digital map of a geographic area is provided via a user interface of a computing device. A selection of a point on the digital map is received, where the selected point corresponds to a selected location within the geographic area. In response to receiving the selection of the point and without receiving a request for directions from a user via the user interface, an indication of a length of a trip between a current location of the computing device and the selected location is automatically obtained. The indication of the length of the trip along with the interactive digital map are displayed via the user interface.

17 Claims, 32 Drawing Sheets

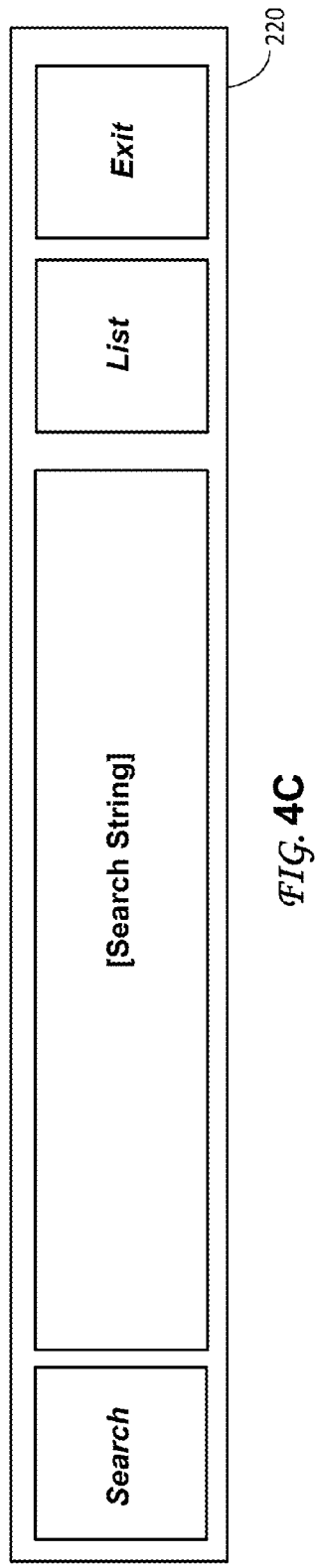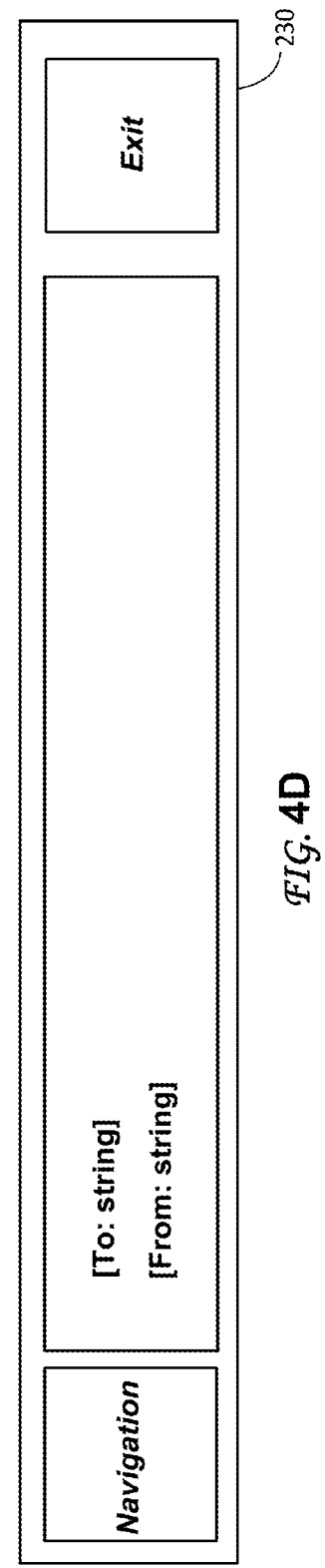

810 → ORDER: 01, 02, 03, 04, 05, 06, etc.

810 → ORDER: 02, 01, 02, 03, 04, 05, 06, etc.

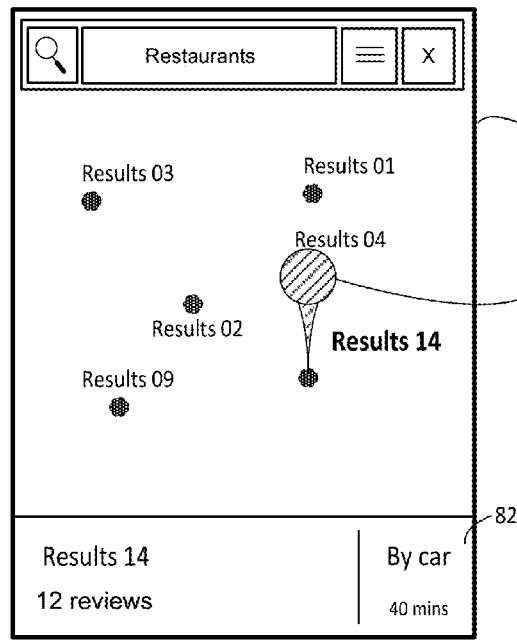
*FIG.* 11C
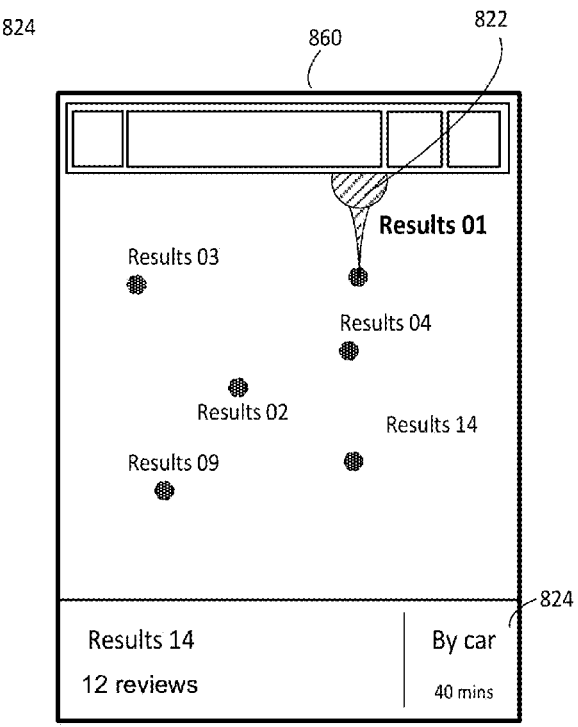
*FIG.* 11D

AUTOMATIC DISPLAY OF TRIP INFORMATION IN A MAPPING APPLICATION

CROSS-REFERENCE TO RELATED APPLICATIONS

This application claims priority to U.S. Provisional Patent Application No. 61/719,746, filed on Oct. 29, 2012, and titled "Interactive Digital Map on a Portable Device," and U.S. Provisional Patent Application No. 61/732,905, filed on Dec. 3, 2012, and titled "Interactive Digital Map on a Portable Device," the entire disclosures of which are hereby expressly incorporated by reference herein.

FIELD OF THE DISCLOSURE

The present disclosure relates to techniques for providing geographic content on a computing device and, more particularly, to automatically providing an indication of a length of a trip between the current location of the computing device and a location on a digital map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many portable devices support software applications that display interactive digital maps. Some of these software applications are developed primarily for providing interactive digital maps. Other software applications, such as web browsers, may display interactive digital maps along with other content. These software applications collectively can be referred to as "mapping applications" for convenience. Mapping applications generally provide multiple functions for interacting with the digital map, such as changing the zoom level, repositioning the viewport, etc. Moreover, mapping applications often provide additional information and services related to digital maps.

One example of such services is providing directions for travelling between a source and a destination by car, public transit, bicycle, or on foot. A mapping application running on a client device can transmit a request specifying the source, the destination, and the mode of transport to a navigation server. The navigation server in response can provide the directions as a sequence of steps, such as "turn right onto 9$^{th}$ Street" or "take the Purple Line to the Linden stop." Because the mapping application contacts one or several servers via a communication network to retrieve directions, the user typically observes a delay when viewing directions or information related to directions.

SUMMARY

When a user selects a location an interactive digital map displayed on a computing device, a mapping application automatically displays an estimate of how long a trip between the current location and the selected location is. The estimate can include distance (e.g., 4.2 miles), time (e.g., 53 minutes), or both. The user can select the location in a number of ways, such as tapping on the touchscreen, clicking on (or hovering over) the desired location with a mouse cursor, and interacting with geographic search results in an informational card, for example. The mapping application can obtain and display an indication of the length of the trip prior to receiving a request for directions from the user. In an example scenario, the user enters a search query when the mapping application displays a digital map of a certain geographic area in the viewport. The mapping application receives, from a search server, search results that indicate several locations within the geographic area and automatically, without receiving a request from the user, obtains estimates of how long trips to these locations from the current location will be. To this end, the mapping application can query the navigation server. When the users then reviews the search results (e.g., by scrolling through the corresponding informational cards), the user immediately sees how long the trip to each location is likely to be. If the user then requests step-by-step directions to one or several of the locations indicated in the search results, the mapping application can request the step-by-step directions from the navigation server.

An example embodiment of the techniques of the present disclosure is a method in a computing device for efficiently providing information related to directions to a user. The method includes (i) providing an interactive digital map of a geographic area via a user interface of the computing device, (ii) receiving, by one or more processors via a user interface of the computing device, a selection of a point on the digital map, where the selected point corresponds to a selected location within the geographic area, (iii) in response to receiving the selection of the point and without receiving a request for directions from a user via the user interface, automatically obtaining an indication of a length of a trip between a current location of the computing device and the selected location, by the one or more processors, and (iv) displaying, via the user interface, the indication of the length of the trip along with the interactive digital map.

Another example embodiment of the techniques of the present disclosure is a non-transitory computer-readable medium storing instructions for generating interactive digital maps via a user interface of a computing device disposed at a current location. The instructions execute on one or more processors to (i) provide an interactive digital map of a geographic area via a user interface of the computing device, (ii) receive a search term via the user interface, (iii) obtain several search results corresponding to the received search term, where each of the several of search results corresponds to a respective location within the geographic area, (iv) automatically and without receiving a user request via the user interface, obtain indications of lengths of trips between the current location and the locations corresponding to the plurality of search results, and (v) provide, via the user interface, indications of the lengths of the trips along with the interactive digital map.

Yet another example embodiment of the techniques of the present disclosure is a computing device including one or more processors, a user interface including a display device, and a non-transitory computer-readable medium storing instructions. The instructions, when executed on the one or more processors, cause the computing device to (i) provide an interactive digital map of a geographic area via the user interface, (ii) receive, via the user interface, a selection of a point on the digital map, where the selected point corresponds to a selected location within the geographic area, (iii) in response to receiving the selection of the point and without receiving a request for directions from a user via the user interface, automatically obtain an indication of a length of a trip between a current location of the computing device and the selected location, and (iv) display, via the user interface, the indication of the length of the trip along with the interactive digital map.

BRIEF DESCRIPTION OF THE DRAWINGS

FIGS. 4A-D illustrate several example states of a multi-purpose dialogue box, or "an omnibox," which the mapping application of FIG. 1A may display over a digital map;

FIG. 11C illustrates the list of FIG. 11B, modified in view of another user selection;

FIG. 11D illustrates the list of FIG. 11C, modified in view of another user selection;

DETAILED DESCRIPTION

Using some or all of the techniques of the present disclosure, a software application on a portable device provides an intuitive and efficient user interface for interacting with a digital map. As discussed in more detailed below, this software application (the "mapping application") in some states may provide an interactive digital map in one window or "sheet" and information related to places of interest, driving directions, transit directions, etc. in another, independently operable interactive informational sheet. Depending on the current state of the mapping application, the informational sheet can take up a relatively small or a relatively large portion of the available screen real estate. Further, the mapping application allows the user to efficiently navigate through generations of informational sheets without completely occluding the map. For example, the user can swipe left and right to step through directions, route options, search results, etc. When the user makes a selection via the informational sheet, information in the map sheet is immediately updated, according to some scenarios. Conversely, the mapping application provides interactive personalized icons ("smart map icons") on the digital map, and the user can tap on such an icon to bring up an informational sheet or update data in an informational sheet.

Still further, the mapping application provides a multi-purpose dialogue box ("an omnibox") with an input field and one or more buttons for entering search terms, requesting directions, etc. The mapping application can dynamically updates the selection of controls within the omnibox and the input format of the input field depending on the user interaction with the digital map.

The mapping application also can implement additional features to simplify and otherwise improve user interaction with map content, geographic search results, driving directions, step-by-step navigation, transit directions, walking directions, etc. For example, as discussed below, the mapping application can automatically provide geographic input suggestions relevant to the particular input field with which the user is interacting, provide a substantially real-time user experience when the user requests transit directions, and present search results in an intuitive manner via one or more windows.

I. System Overview

Figure 1A:
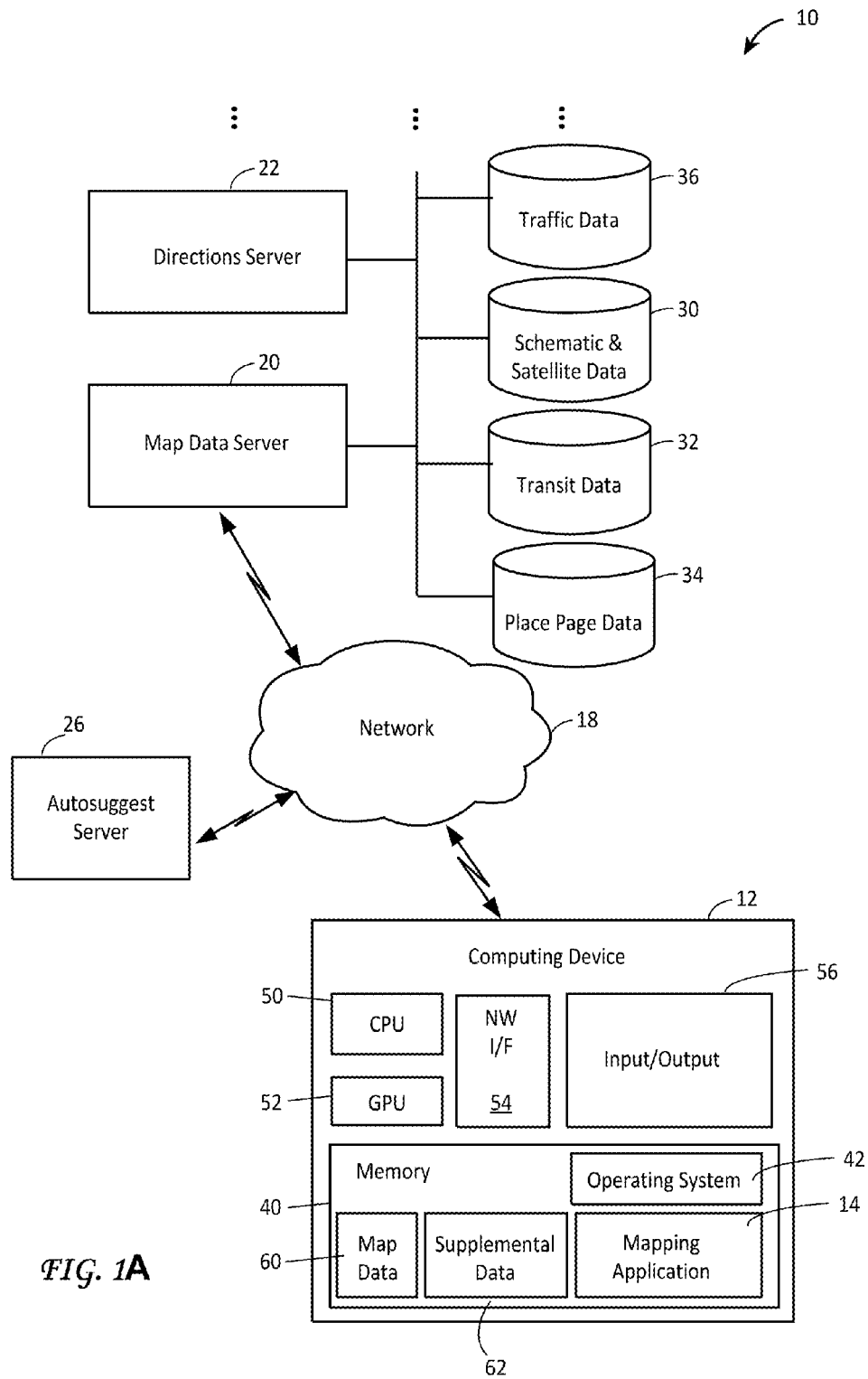
FIG. 1A is a block diagram of an example communication system in which a mapping application receives map data from one or more servers and provides an interactive digital on a portable device.

FIG. 1A illustrates an example communication system 10 in which these techniques can be implemented. The communication system 10 includes client devices such as a client computing device 12 that executes a mapping application 14 configured to provide an efficient and intuitive user interface for interacting with a digital map. In addition to the client devices, the communication system 10 includes a map server 20 and a directions server 22, each of which can be any suitable network device or a group of network devices. The communication system 10 also includes an autosuggest server 26, which may provide search and other suggestions to client devices. In some implementations, the suggestions may be personalized.

The map server 20 may be communicatively coupled to multiple databases such as, for example, (i) a schematic and satellite database 30 storing street and road information, topographic data, satellite imagery, etc., (ii) a transit database 32 storing information related to public transport routes, schedules, alerts, prices, etc., (iii) a place page data 34 storing information about businesses including addresses, hours of operations, customer reviews, etc., (iv) a traffic database 36 storing current traffic conditions, and other databases. In general, the map server 20 can receive information related to geographic locations from any number of suitable databases, web services, etc. One or more operators can periodically update each of the databases 30-36 at respective frequencies. For example, the traffic database 36 may store real-time data, whereas the schematic and satellite database 30 may be updated relatively infrequently, such as once a week.

The schematic and satellite database 30 can store data in a raster format, a vector format, or both. Further, in some implementations, the data is organized into map tiles at multiple zoom levels to facilitate serving map data to client devices. Depending on the implementation, the map data server 20 can provide map and directions data to client devices separately or together in map tiles, for example.

In an example implementation, the computing device 12 is a portable device that includes a memory 40, one or more processors (CPU) 50, a graphics processing unit (GPU) 52, a network interface unit 54, and an I/O module 56. The memory 40 may be tangible, non-transitory memory and may include any types of suitable memory modules, including random access memory (RAM), read only memory (ROM), flash memory, other types of persistent memory, etc. In addition to the mapping application 14, the memory 40 stores an operating system (OS) 42 and one or more applications or modules. The operating system 42 may be any type of suitable operating system, such as Android™ or iOS™, for example. The I/O module 56 may be a touchscreen, for example. More generally, these techniques can be implemented in other types of devices, such as laptop or desktop computers, car navigation units, etc.

The mapping application 14 generates a digital map using vector graphics data, raster tiles, or map data in any other suitable format for display on a screen. In some cases, the map generating routine 28 generates a 3D mesh to be textured using photographic images or other suitable description of 3D geometry for a geographic area.

Depending on the implementation, the mapping application 14 is a separate executable made up of compiled instructions that execute directly on the operating system 42, instructions in a scripting language (or another suitable format) that are interpreted at run time by another application such as a web browser, a plugin that extends the functionality of another software application, etc. In one example implementation, the mapping application 14 is an "app" downloaded onto the portable computing device 12 from a web server. In another implementation, the mapping application 14 is a web browser. In yet another implementation, the mapping application 14 is a "cloud" application that executes primarily on one or more cloud servers (not shown) and exchanges input and output data with the computing device 12 in real time.

In operation, the mapping application 14 requests map data and, depending on the scenario, supplemental data including traffic information, directions, business information, etc. from the map data server 20. The mapping application 14 temporarily stores this information in the memory 40 as map data 60 and supplemental data 62, respectively.

Figure 1B:
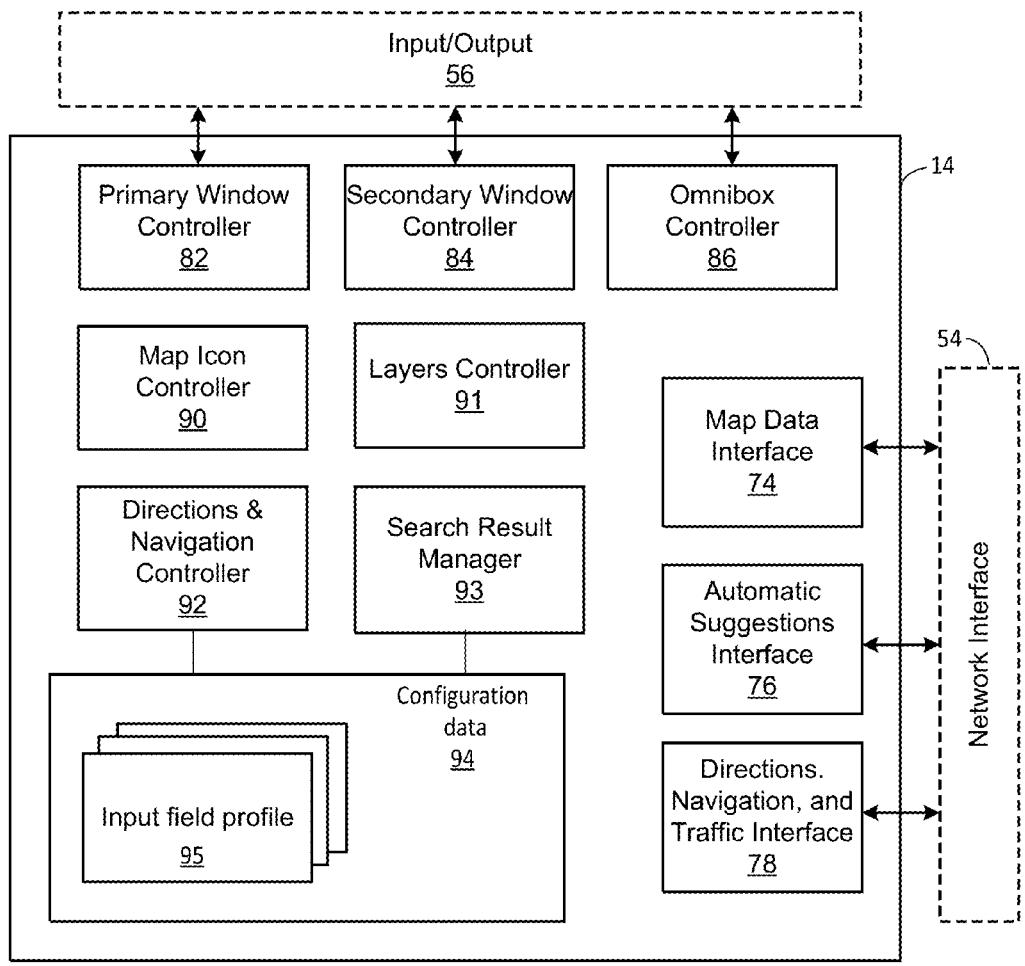
FIG. 1B is a block diagram of the mapping application of FIG. 1A, in an example implementation.

FIG. 1B illustrates an example implementation of the mapping application 14 in more detail. The components illustrated in FIG. 1B can include, for example, software instructions in any suitable programming language. In some implementations, different components are implemented using different programming techniques. For example, some of the components may be provided as plug-ins or extensions to the mapping application 14 accessible via one or more application programming interface (API) functions, some of the components may be provided as shared libraries, etc.

In this example, the mapping application 14 includes several components coupled to the network interface 54: as a map data interface 74 configured to request map data in a vector, raster, or any other suitable format; an automatic suggestions interface 76 configured to transmit partially and/or fully completed user input to a suggestions server and receive suggestions (along with other information, such as indications of the sources of the suggestions) from the suggestions server; and an interface 78 configured to retrieve directions, navigation, and traffic data from the corresponding servers.

The mapping application 14 further can include a primary window controller 82 and a secondary window controller 84 to control a primary window in which a digital map is displayed and a secondary window in which additional information is displayed, respectively. An omnibox controller 86 is configured to control states of controls in an omnibox and a format of the input field, for example. The components 82, 84, and 86 are coupled to the input/output module 56 discussed above.

Figure 2:
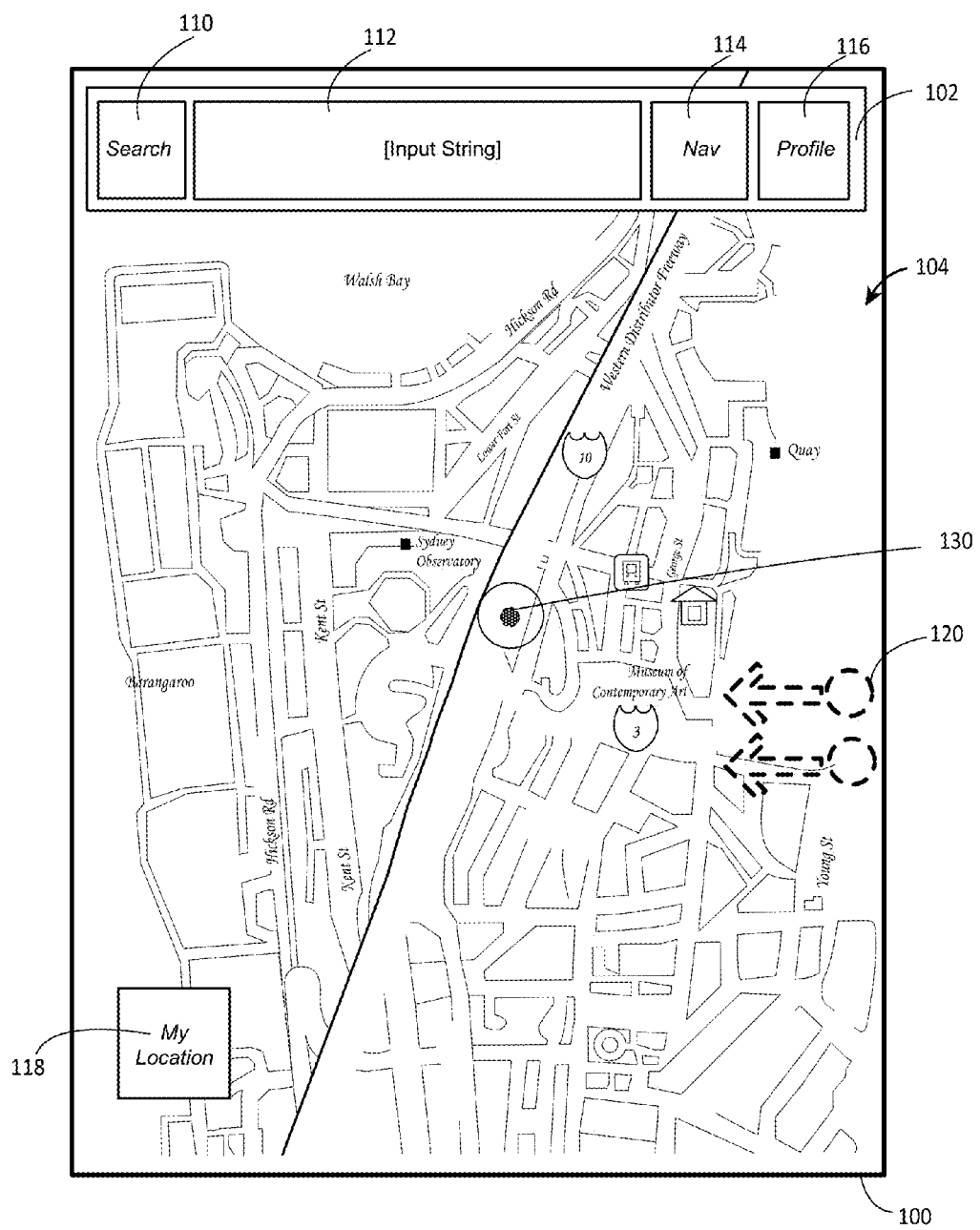
FIG. 2 illustrates user interface components for a mapping application of FIG. 1A, according to an example implementation.

With continued reference to FIG. 2, the mapping application 14 also can include a map icon controller 90 to manage the selection, placement, and activation of icons and smart (i.e., interactive) icons. A layers controller 91 determines the type of map data to be presented as part of the digital map. For example, the layers controller 91 may display traffic data over a base map, in a certain scenario. Further, a directions and navigation controller 92 can retrieve and display driving, walking, and transit directions, provide step-by-step navigation, and a search results manager 93 can process search queries, format and present search results in compact or detailed informational sheets, etc. During operation, the components 92 and 93 can utilize configuration data 94 that includes, for example, input field profiles 95 that specify the format of input fields, automatic suggestions configuration, and other parameters.

II. Overview of User Interface Components

FIG. 2 illustrates example user interface components of the mapping application 14 discussed above. A screen 100 includes a multi-purpose dialogue box, or "omnibox" 102 that overlays a map image (for simplicity, "the map") 104. Referring back to FIG. 1B, the omnibox controller 86 generates and maintains the omnibox 102, according to some implementations. The omnibox 102 includes an indicator 110 that identifies the current state of the map 104 (e.g., search, navigation, etc.), a text input area 112 that supports single-line or multi-line text input, a navigation button 114 for invoking the navigation (and/or directions) functionality, and a profile/settings button 116 for configuring the user's profile if she is signed in or configure general application settings when the user is not signed in. In the illustrated implementation, the omnibox 102 is located in a fixed position at the top of the page and occludes the portion of the map 104 which it overlays. In other implementations, however, the mapping application 14 displays the omnibox 102 in other portions of the screen 100 in an opaque, semi-transparent, or other suitable manner.

A self-positioning button 118 overlays the map image 104. When the user clicks on the button 118, a positioning indicator 130 appears in the appropriate location on the digital map 104, provided the computing device 12 supports geopositioning. In an example implementation, the positioning indicator 130 is illustrated as being enclosed in a circle, with the radius of the circle being indicative of the degree of certainty during geopositioning.

The mapping application 14 displays personalized tappable "smart" map icons which correspond to various points of interest or, more generally, locations. As discussed in more detail with reference to FIGS. 5A-C, the mapping application 14 may display a "bubble" over the location corresponding to the selected icon or a compact informational sheet at the bottom of the screen 100, depending on the state of the map 104 The mapping application 14 may provide different selections of icons for different zoom levels. When multiple icons are mapped to the same area of the screen, the mapping application 14 may select the icon to be displayed using the following priorities, listed in the descending order: My Location icon, Selected Place pin, Search Result icons, Home/Work icon, Starred location, and a basic smart map icon.

When the mapping application 14 is launched, the computing device 12 may display a splash screen while the application is being loaded. The mapping application 14 then may display the map 104 with the viewport centered at the user's current location. If location services are disabled, the mapping application 14 may set the viewport to the user's most recent session. If no such location is available, the mapping application 14 may center the viewport around a famous location, such as Stonehenge, to indicate to the user that the displayed location is not nearby.

For some features, the mapping application 14 provides multiple ways to activate a function. For example, the mapping application 14 may provide a directions button in the omnibox to bring up a start page for directions as well as a directions button on the informational sheet for a business or another type of location.

III. Efficiently Selecting Layers of Information

Figure 3:
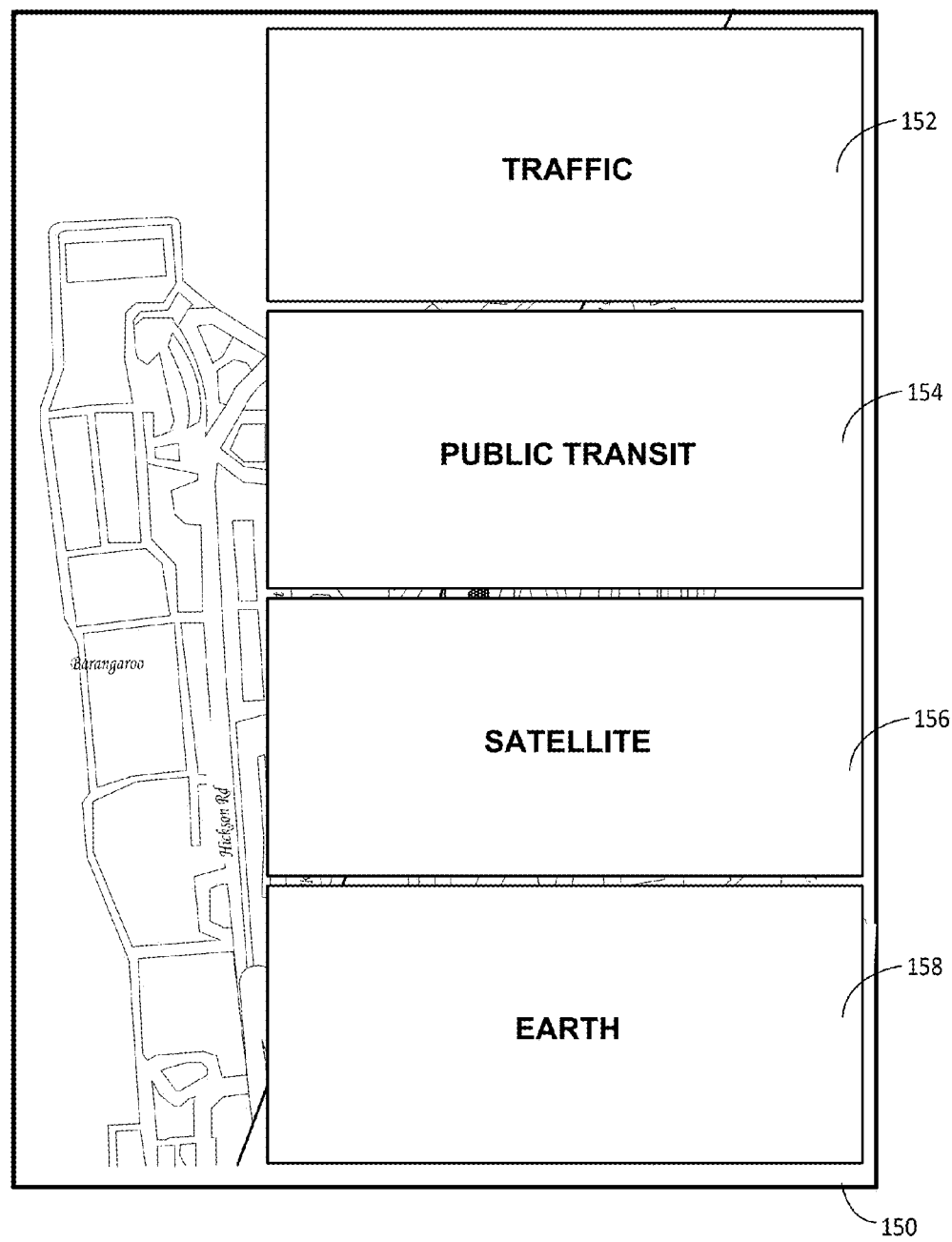
FIG. 3 illustrates an example interface for selecting layers of map data, which the mapping application of FIG. 1A may implement.

In response to a two-finger swipe gesture, illustrated schematically with arrows 120, the mapping application 14 may reveal a layers selection screen 150 of FIG. 3. In this manner, the mapping application allocates more real estate to map data and obscures less of the map 104. In other implementations, other single or multi-finger gestures may be used. Alternatively, a button or a tab may be provided on the screen 100 for tapping or dragging, respectively.

As illustrated in FIG. 3, the screen 150 includes several buttons for adding respective layers of information to the digital map 104. In particular, the screen 150 includes a traffic button 152, a public transit button 154, a satellite button 156, and an earth view button 158. In one implementation, the mapping application 14 displays button for only those layers of information that are available. For example, if traffic information is not available, the screen 150 does not include the button 152. When the user selects one of the buttons 152-158, the mapping application 14 displays information in the selected layer over the map 104. In at least some of the cases, multiple layers can be applied to the map 104.

The mapping application 14 may prefetch information about the available layers of information when map data for a geographic region is retrieved. In this manner, the mapping application 14 can transition from the screen 100 of FIG. 2 to the screen 150 without a noticeable delay.

IV. State-Dependent Dialogue Box

Figure 4A:
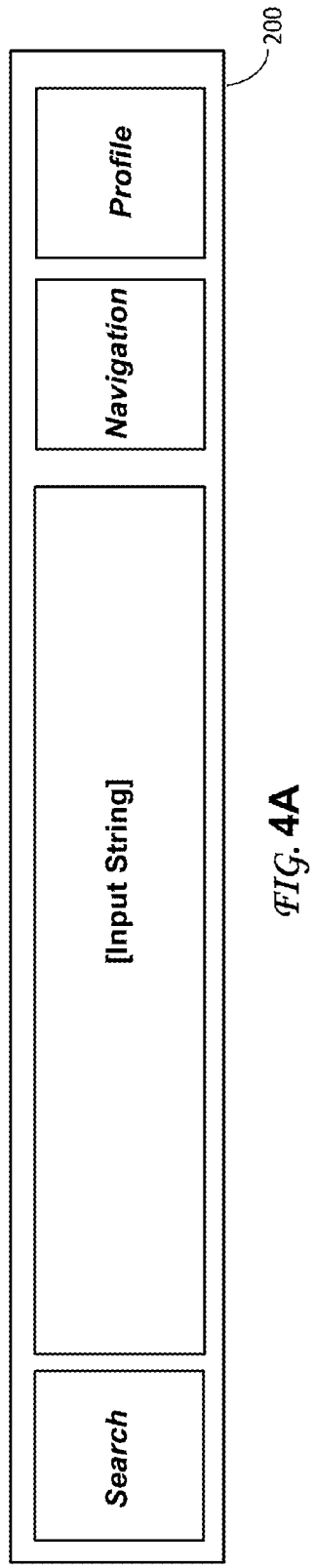
Figure 4B:
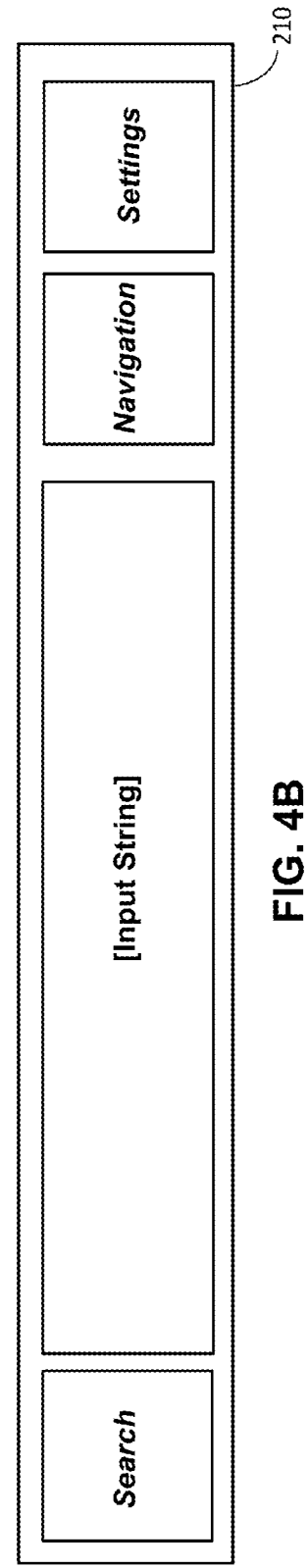

Now referring to FIGS. 4A-D, the omnibox 102 of FIG. 2 may appear in various configurations including configurations 200, 210, 220, and 230. In general, different configurations of the omnibox 102 are associated with different selections of icons, controls, and functions, and correspond to different states of the mapping application 14. For example, in the default state of the mapping application 14 when the user is signed in, the configuration includes a search indicator or icon, an input box for entering search terms, a directions button, and a signed-in profile button (FIG. 4A). In the default state when the user is signed out, the configuration 210 also includes a search icon, an input box for entering search terms, and a directions button, but the profile button is replaced with an application settings button (FIG. 4B). Further, in the search state, the configuration 220 includes a search icon, a search box that lists the entered search terms, a list view button if multiple results are available, and an exit button (FIG. 4C). Still further, in the direction state, the omnibox displays the directions icon, a directions summary including the mode, the start location, and the destination location, and an exit button (FIG. 4D). In this state, the user can tap on the directions summary to edit directions, or exit by clicking on the exit button. In some scenarios, the directions icon is tappable. For example, the mapping application 14 may display an alternate routes in response to the user tapping on this icon.

Transitions between states of the mapping application 14 can occur in response to completion of an operation (such as a navigation session) or the user operating the exit button, for example. More particularly, the mapping application 14 may return to the previous state in response to the user tapping on the exit button. As another example, the mapping application 14 supports the following sequence of transitions: (i) returning to directions during navigation if the user exits navigation prior to reaching her destination, and (ii) when the user clears the directions, the application returns to the previously accessed map. Further, upon clearing search results, the mapping application 14 returns the user to a base map with an empty omnibox.

In a certain implementation, the mapping application 14 clears all of its states in response to a long press on the exit button. The mapping application 14 can return to a default state, such as the state illustrated in FIG. 4A.

The mapping application 14 in some cases updates the format of the input box 112 and/or the selection of controls 114 and 116 in response to the user activating a certain icon displayed on the digital map 104. Further, the mapping application 14 may automatically update the digital map 104 in response to the user activating a control within the omnibox 102.

V. Map Alignment

The mapping application 14 may provide an "orient myself" function as an icon or a recognized gesture, for example. When the user invokes the "orient myself" function, the notational (virtual) camera automatically tilts to display more information in front, thereby creating a sense of perspective. When the map 104 is rotated or tilted, such that it is no longer north-up or 2D, the mapping application 104 can display a compass icon. In the navigation mode, however, the compass icon is also visible. When the compass icon is toggled, the mapping application 104 switches between north-up, 2D and head-up, 3D modes.

VI. Screen Transitions in a Mapping Application

The mapping application 104 can efficiently manage screen real estate by selectively activating, for example, a compact informational sheet within a secondary window that obscures a small fraction of the screen and provides additional information or a larger, more detailed informational sheet in the secondary window that obscures more of the screen. Selection of informational sheets may depend on the state of the mapping application 104. In the meantime, the primary window may display a digital map of an area, and may be largely independent of the secondary window.

Figure 5A:
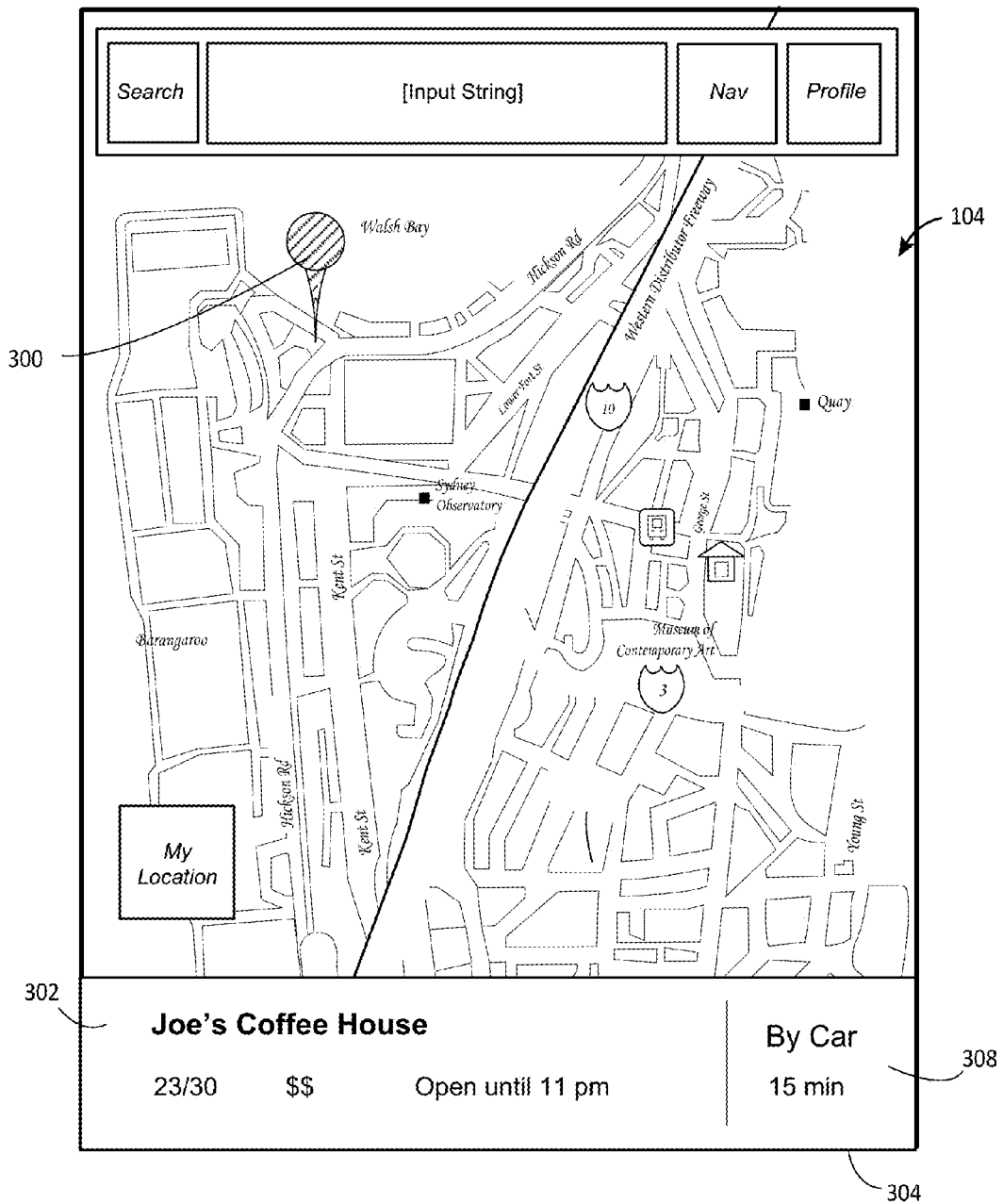
FIG. 5A illustrates an example multi-sheet map interface with a compact informational card being displayed, which the mapping application of FIG. 1A may implement.
Figure 5B:
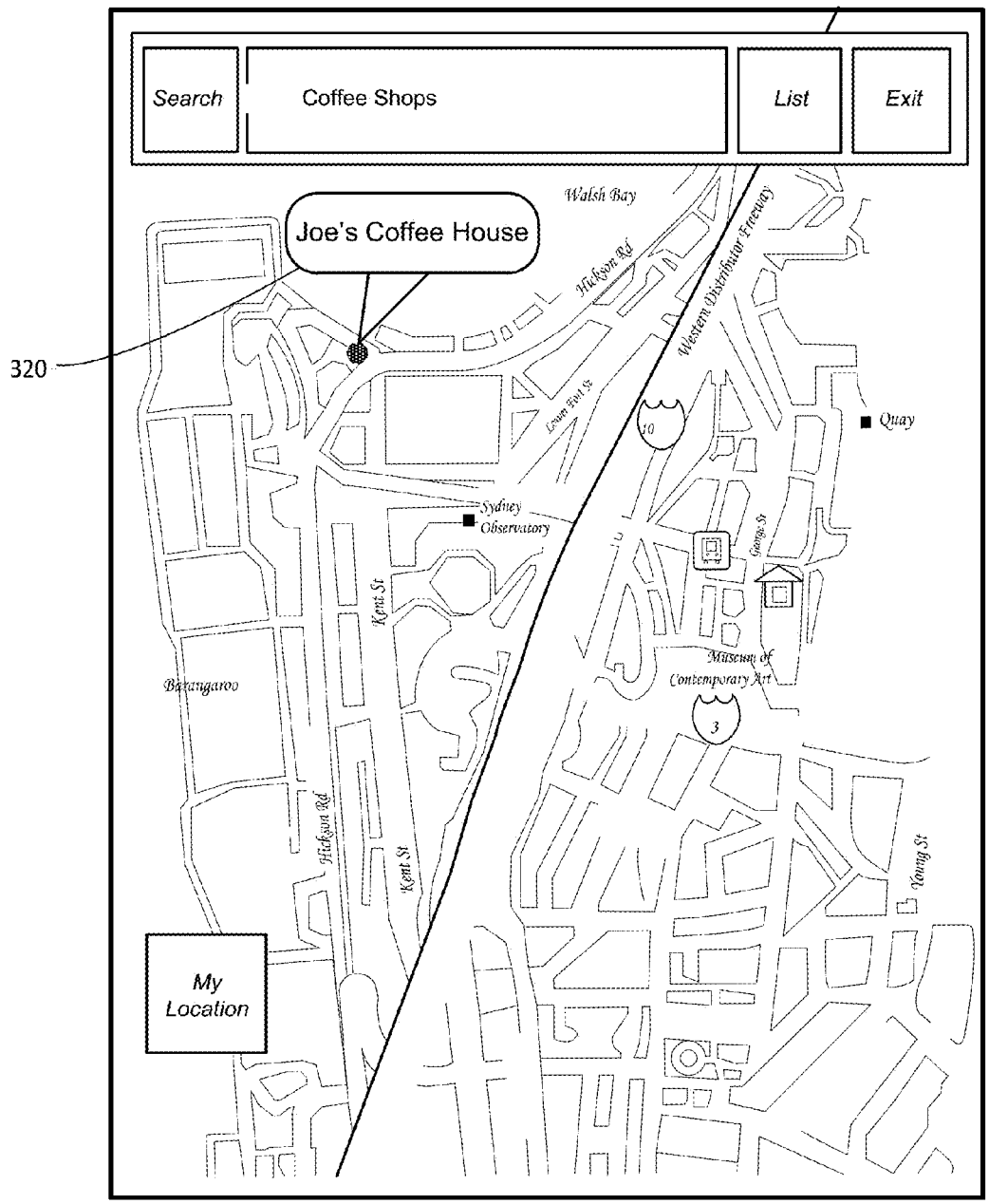
FIG. 5B is an example screenshot in which an informational "bubble" window is displayed in response to a user activating a smart map icon in a search state of the mapping application.

For example, as illustrated in FIG. 5A, the user may click on a smart map icon or a pin, such as the pin 300, in the search state, and the mapping application 14 in response may display a compact informational sheet 302 in the secondary window located in the lower portion of the screen 304 (or elsewhere on the screen 304). The primary window displays the digital map 104. In this example, the digital map 104 is partially occluded by the compact informational sheet 302 and the omnibox, The compact informational sheet 302 in general includes basic information about the selected location such as a name of the place to which the pin 300 corresponds, review information (in this case, 23 positive reviews out of 30), a price range, and business hours. Further, the compact informational screen 302 may include a tappable icon 308 for requesting directions. The compact informational screen 302 includes estimated time of arrival (ETA) for reaching the selected place by car, according to one implementation. Thus, even before the user requests detailed information, the mapping application 14 indicates how long the user would take to reach the destination. In this example, the mapping application 14 calculates the ETA in terms of driving if car was the last transportation mode the user used. If the distance is above a certain threshold (e.g., 400 miles), the mapping application 14 does not display ETA and displays the number of miles (or kilometers, depending on the region) to the destination instead.

It is noted that the state of omnibox on the screen 304 need not change during interaction with the pin 300. More generally, the mapping application 14 need not update the omnibox when the user interacts with smart map icons.

The user can deselect the place and cause the mapping application 14 to remove the compact informational sheet 302 by tapping outside the pin 300. However, during an ongoing search or a directions viewing session, for example, tapping on the smart map icon causes the application to display an informational "bubble" 320, according to one implementation illustrated in FIG. 5B. If the user then selects the bubble by tapping, for example, the mapping application 14 displays a detailed informational sheet 350 illustrated in FIG. 5C. In another scenario, the mapping application 14 transitions from the screen of FIG. 5B to the screen of FIG. 5C when the user pulls the compact informational sheet 302 upward to reveal the detailed informational sheet 350. The mapping application 14 may collapse the detailed informational sheet 350 and return to the screen of FIG. 5B in response to the user tapping on the map outside the detailed informational sheet 350.

Figure 5C:
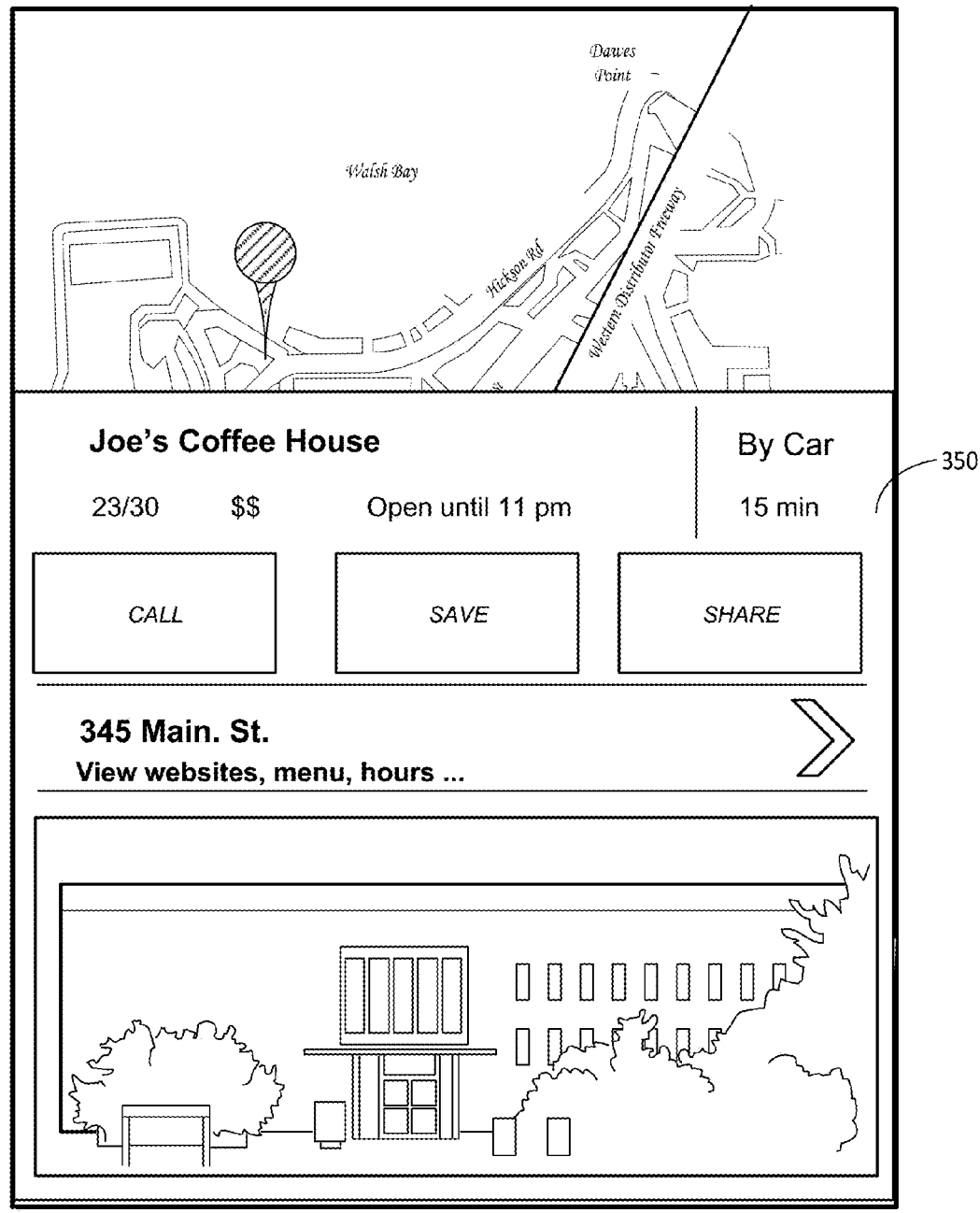
FIG. 5C illustrates an example multi-sheet map interface with a detailed informational card being displayed, which the mapping application of FIG. 1A may implement.

As illustrated in FIG. 5C, the detailed informational sheet 350 can include most or all of the information included in the compact informational sheet 302, along with a button to call the place directly (when the phone number is available), buttons to bookmark the place and share the place with other users, and an entry point for accessing website, menus, and other information (possibly via another application, such as a web browser). The detailed informational sheet 350 can occupy approximately ⅔ of the available screen real estate. Further, the detailed informational sheet 350 may include one or several photographs of the place.

As the user scrolls through generations of the compact informational sheet 302, the viewport in the map sheet automatically pans and adjusts the zoom level, when necessary. In some scenarios, for example, the user scrolls through informational sheets 350 that correspond to different locations on the digital map 104. To this end, the user may swipe the informational sheet 250 to the right or to the left. If the location to which a new generation of the informational sheet 350 corresponds is outside the currently active viewport, the zoom level and/or the position of the viewport may be automatically updated.

In one implementation, the compact informational sheet 350 travels up to the top of the screen and "sticks" while the area underneath remains scrollable, when the user scrolls vertically through the compact informational sheet 350. More particularly, the compact informational sheet 350 may include information that can be exposed if the user pushes the compact informational sheet 350 upward.

Depending on the implementation, the mapping application 14 can prefetch detailed information necessary to generate the detailed informational sheet 350 when the user clicks on the corresponding smart map icon or pin but before the user explicitly requests a transition from the compact informational screen 302 to the detailed informational sheet 350. In this manner, the mapping application 14 can implement quick and seamless transitions between views. In another implementation, however, the mapping application 14 requests detailed information only after the user explicitly expresses interest in this information (by tapping on the compact informational screen 302, for example).

VII. Prefetching Place Page Data

More particularly, in response to the user selecting a geographic area for which map data is unavailable on the client computing device 12, the mapping application 14 may request map data along with at least some of the information required to display a compact informational sheet 302 and/or a detailed informational sheet 350 for the locations within the selected geographic area. For example, in one implementation, the mapping application 14 requests, for every selectable or searchable location within the selected geographic area, only the information necessary to display a compact informational sheet 302, if needed. This limited information may include the address, hours of operation, a thumbnail photo, for example. When the user selects the corresponding location on the map, the mapping application 14 displays the corresponding compact informational sheet 302 without sending a request to the map data server 20. However, if the user requests further information, such as the information for displaying a detailed informational sheet 350, the mapping application sends a request to the server.

In other words, the mapping application 14 prefetches information ahead of an explicit request from the user to display the information. Thus, in this example implementation, the user sees little or no delay in retrieving a compact informational sheet for a location within the viewport, but the user may see some delay when requesting all of the available information.

It is noted that this technique also can be implemented as part of search functionality and in other contexts where geographically relevant information is not automatically provided with the digital map.

VIII. User Interface for Providing Driving Directions

Figure 6A:
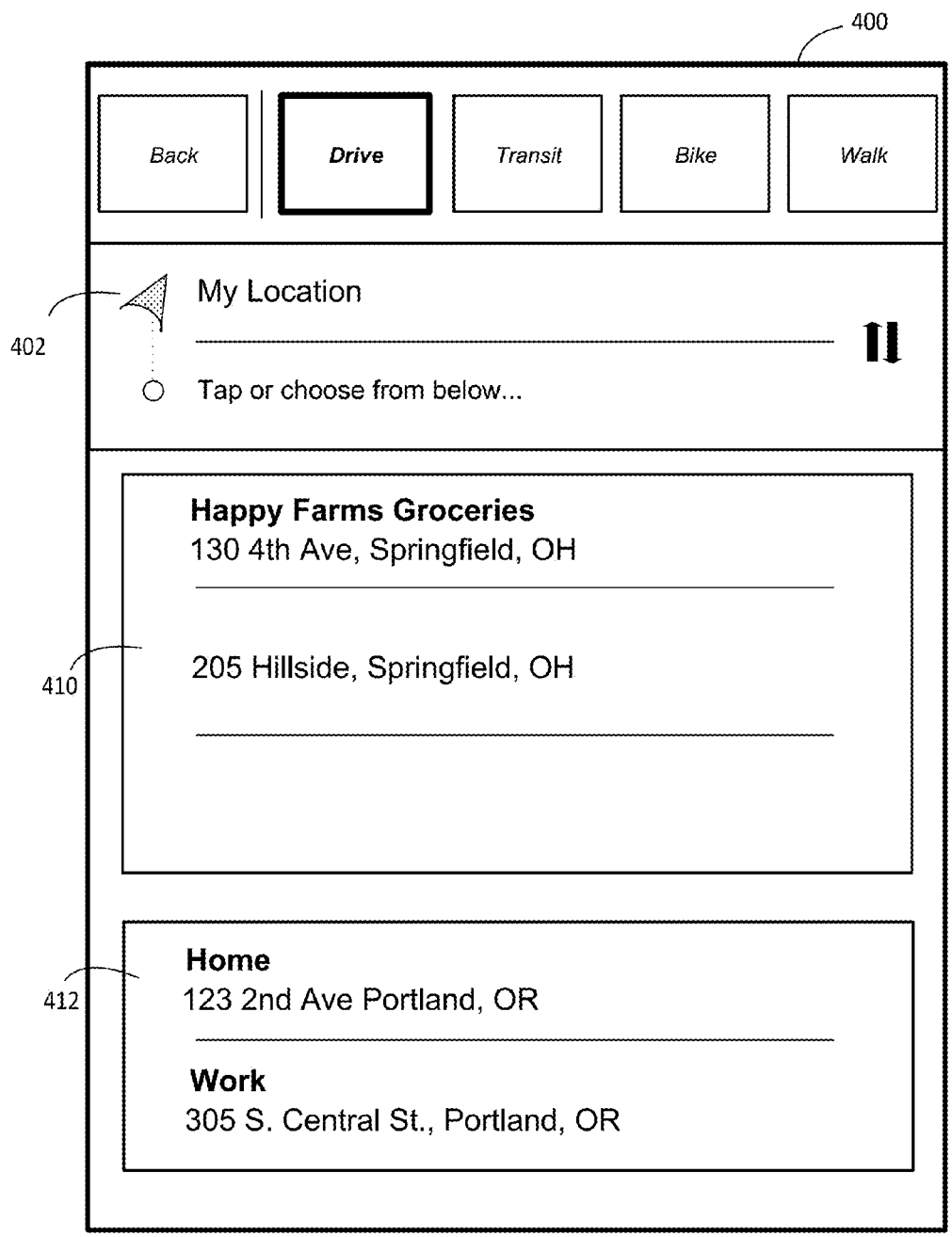
FIG. 6A illustrates an example start page for requesting driving directions, which the mapping application of FIG. 1A may implement.

As indicated above, the mapping application 14 displays a directions button in the omnibox when no search results are shown. When the user clicks on this button, the mapping application 14 brings up a directions start page illustrated as a screen 400 in FIG. 6A, according to one example implementation.

Generally speaking, when a user activates the navigation icon, the mapping application 14 transitions to a screen in which the user specifies the source and the destination of the journey. If the user completes the selection of endpoints by clicking on one of the suggested locations, the application immediately requests and displays the directions. To this end, the application maintains a window (e.g., near the top of the screen) in which the user modifies the sources, the destination, the arrival/departure time, etc., and displays instant directions in another window (e.g., occupying the lower portion of the screen). To initiate the request, the mapping application 14 need not receive an explicit request to search. Further, when the user selects a different time in another window or another generation of the screen, the update is performed immediately to improve user experience.

As illustrated in FIG. 4A, the screen 400 includes a my location button 402 (illustrated as a chevron), a tappable destination button, and a swap button. The user can select the source and the destination from among various options displayed below in suggestion boxes 410 and 412, for example. When the user clicks on the source or destination button, the application displays a screen for entering a location. The mapping application 14 can indicate using colors, for example, whether additional information is required. For example, the source and destination fields may become a darker shade grey once the user fills in the destination via the edit screen.

Figure 6B:
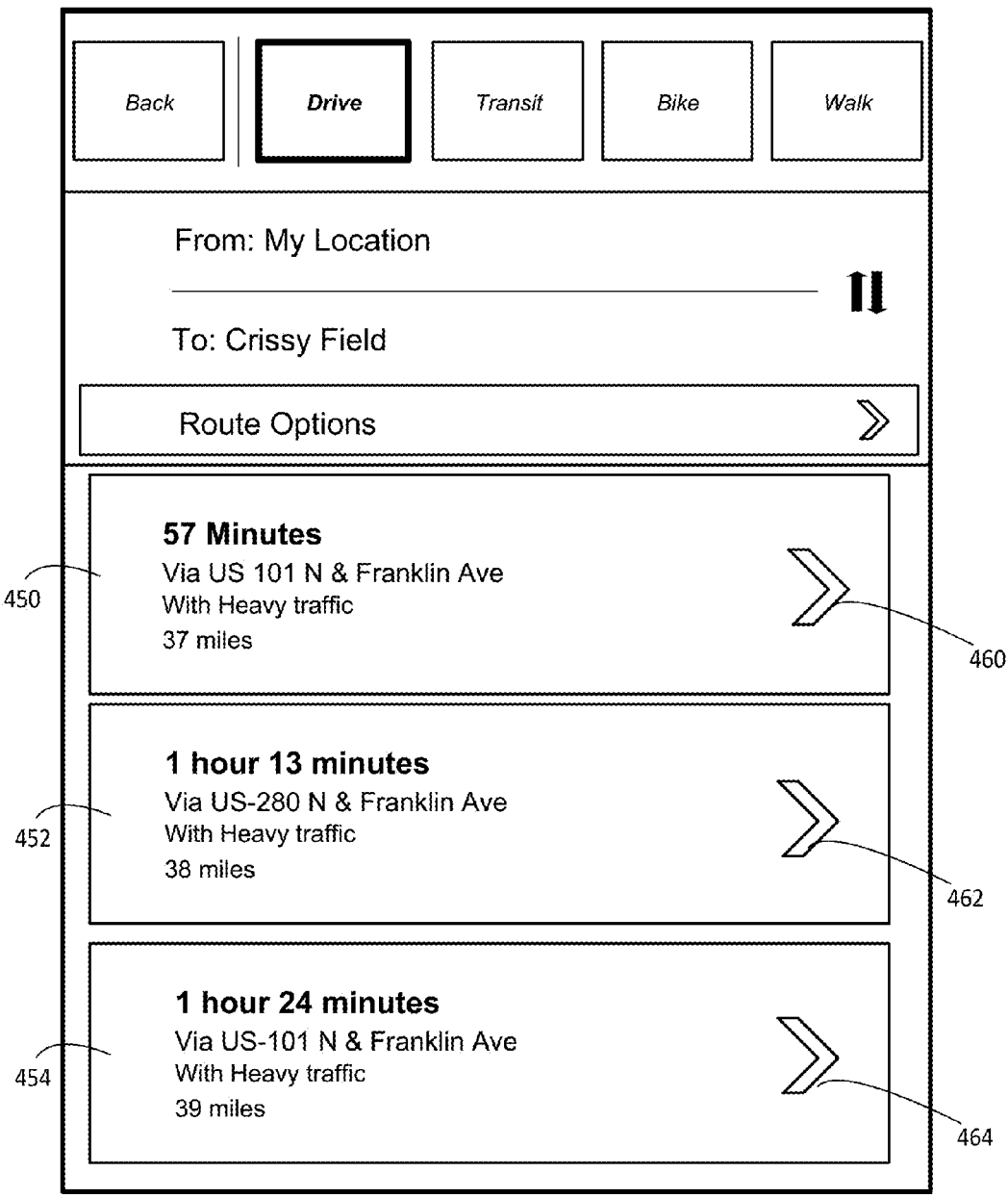
FIG. 6B illustrates an example menu for selecting a set of driving directions, which the mapping application of FIG. 1A may provide in response to a user request.

According to one implementation, the mapping application 14 transmits a directions query to the directions server 22 as soon as the user completes entering the source and the destination. As illustrated in FIG. 6B, the mapping application 14 displays multiple route options in respective directions cards 450, 452, and 454. Each of the cards 450, 452, and 454 includes a respective button 460, 462, and 464 for retrieving the details. The mapping application 14 may rank and color-code the cards 450, 452, and 454 to indicate whether the routes are fast, slow, optimal given current traffic conditions, etc. The user may activate a route options menu to indicate whether the user wants to avoid tolls, avoid highway travel, etc.

Figure 6C:
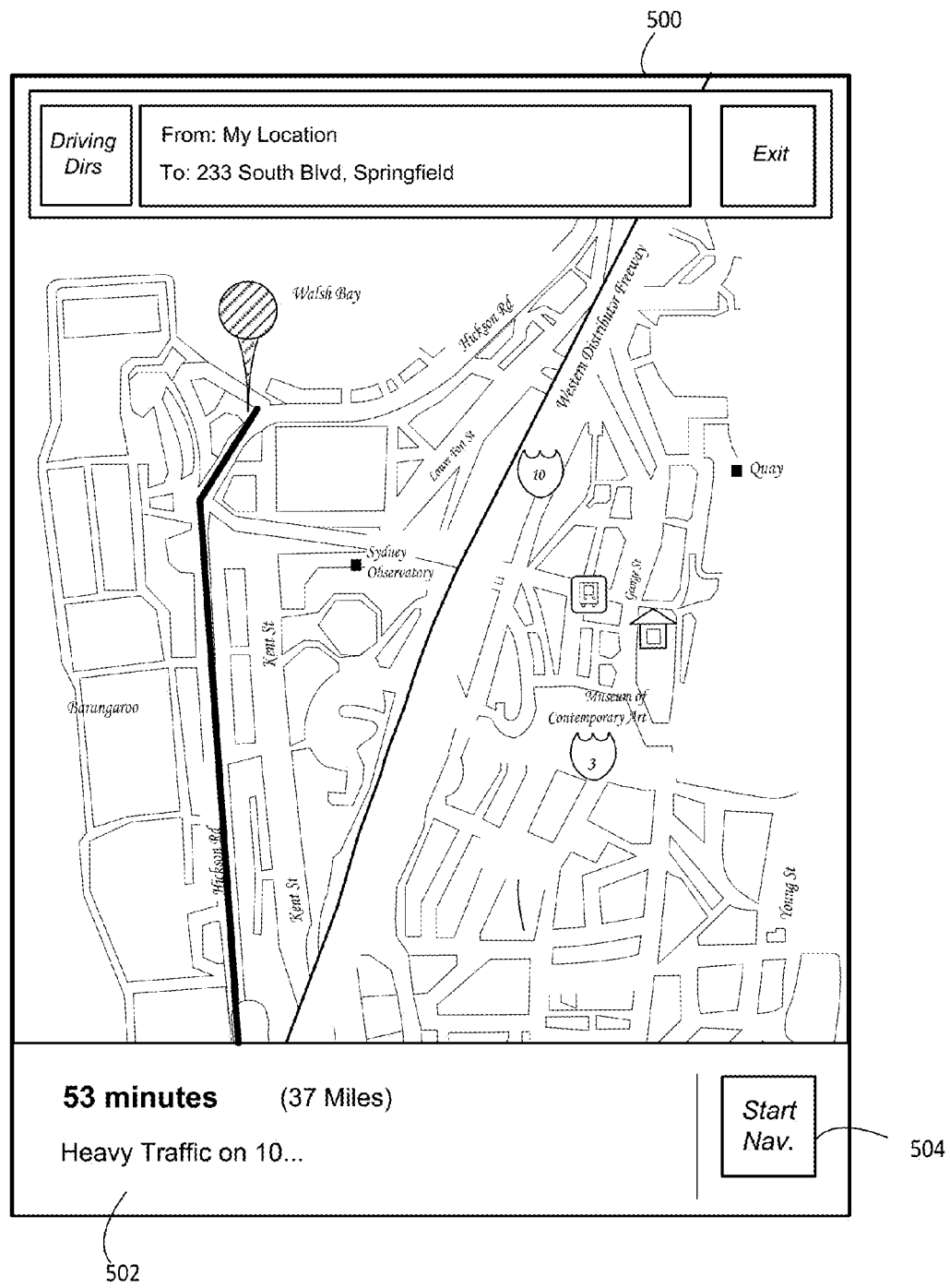
FIG. 6C is an example screenshot with an omnibox overlaying the digital map with a compact driving directions informational sheet, which the mapping application of FIG. 1A may provide in response to a request for directions.

When the user activates one of the buttons 460, 462, or 464, the mapping application 14 generates a screen 500 illustrated in FIG. 6C. The screen 500 includes a driving direction summary sheet 502 with a Start Navigation button 504.

When multiple route options are returned in response to a search for directions, the user can select the desired route, so that the details occupy most of the screen when needed, and inspect different options by swiping left or right. The application also highlights traffic along the route for certain zoom levels and activates the entire traffic layer (i.e., for the entire viewport) when the user zooms out beyond a certain level. When the user selects a new route, traffic along the new route is immediately shown.

The mapping application displays a route overlaying the digital map (see FIG. 6C), with different segments of the route being illustrated differently, such as using different colors, to indicate traffic (not shown in FIG. 6C).

IX. Providing an Instant Indication of a Length of a Trip

Further, when a user selects a location on the digital map on the screen 500 (e.g., by tapping on a place or running a search), the mapping application 14 in some embodiments automatically prefetches the directions to the target location from the current location of the computing device 12 (or another location, depending on the configuration). The directions can be driving directions, walking directions, or public transit directions, for example. As briefly mentioned above with reference to FIG. 5A, for example, the mapping application 14 can then provide an indication of how long the user would take to reach the target location. This indication can include an indication of time, distance, or both. Thus, even before the user requests detailed directions for travelling from the current location to the target location, the mapping application 14 can provide some indication of the length of the trip. In his manner, the mapping application 14 allows the user to quickly make a decision regarding the target location (such as whether the user wants to travel there) without requesting and reviewing detailed directions.

As also indicated above, the mapping application 14 and/or the directions server 22 can calculate the indication of the trip length in terms of the last transportation mode the user selected. Further, the decision whether to display the indication of length in terms of distance or time can be based on whether the distance is above a certain threshold value.

In some embodiments, the mapping application 14 obtains, from the directions server 22 or geographic query server that provides geographic search results, only an indication of the length of the trip without obtaining the detailed, step-by-step directions, prior to the user requesting the step-by-step directions. In this manner, the mapping application 14 does not retrieve step-by-step directions until the user explicitly requests these directions.

Further, the mapping application 14 in some embodiments can receive a set of search results in response to a search query. Each search result can correspond to a location in the geographic area depicted within the current viewport. The mapping application 14 can automatically receive an indication of the length of the trip to the corresponding location along with every search result or, in another implementation, the mapping application 14 automatically requests these indications from the directions server 22 without the user requesting these indications or the detailed directions. In any case, the mapping application 14 can display these indications along with the search results to allow the user to make a more informed choice from among the multiple search results. Thus, if the search results indicate locations of coffee shops within the viewport, the user can immediately see how far away these shops are from the current location. Once the user selects one of the locations by, for example, pulling up the corresponding informational card and clicking on the directions icon, the mapping application 14 can request the detailed directions.

X. Providing Transit Directions

Figure 7A:
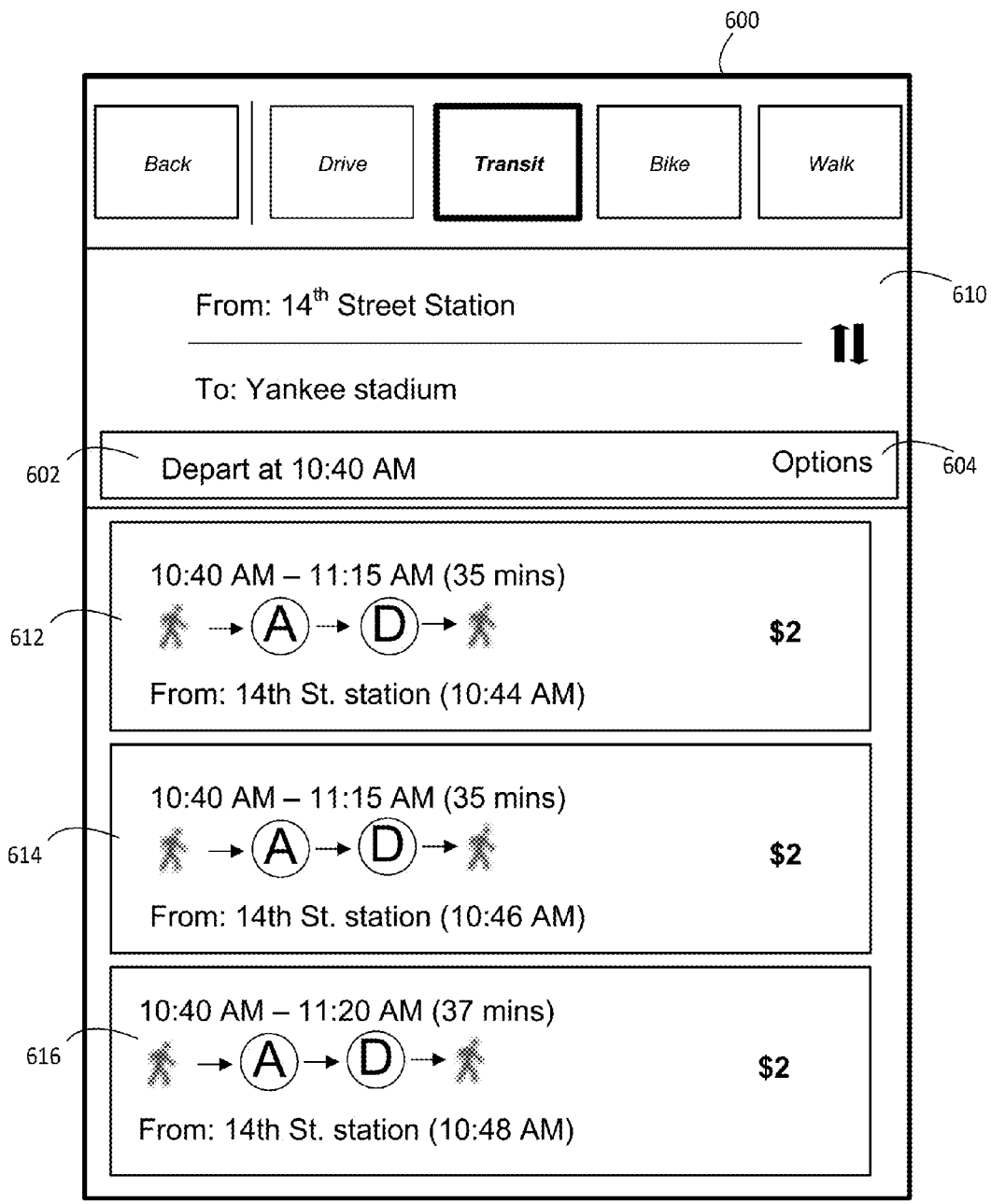
FIG. 7A illustrates an example menu for selecting a set of transit directions, which the mapping application of FIG. 1A may provide in response to a user request.

When the user selects transit directions using the Transit button on the screen 400, for example, the mapping application may display a screen such as the screen 600 of FIG. 7A, for example (provided the source and the destination have been entered or selected from among the suggestions). The screen 600 includes individually selectable route summary cards 612, 614, and 616, each providing an overview of the respective route with time information, cost, etc. The mapping application 14 also provides separate buttons 602 and 604 for Departure Time and (route) Options, respectively. Because the ability to quickly change the departure time is particularly important for schedule-driven transit directions, the mapping application 14 allows the user to simply tap on the button 602 to access a time selection control such as the time barrel illustrated in FIG. 10, for example. The mapping application 14 may update a sheet 610 (that includes the To and From fields, the swap button, and the buttons 602 and 604) separately from the electable route summary cards 612, 614, and 616, so that either one of these portions may change without affecting the other portion.

When the user completes entry of departure time, the mapping application 14 immediately, without requesting confirmation from the user or requiring that the user activate another button on the screen 600, sends an updated query to the directions server 22 and updates the route summary cards. Similarly, when the user updates the selection of endpoints by clicking on the To and From fields, the mapping application 14 immediately requests and displays the updated transit directions. More generally, the mapping application 14 may be configured to update the route summary cards 612, 614, and 616 in response to any action, such as changing of the transportation mode, modifying route options, swapping start and end points, etc.

Figure 7B:
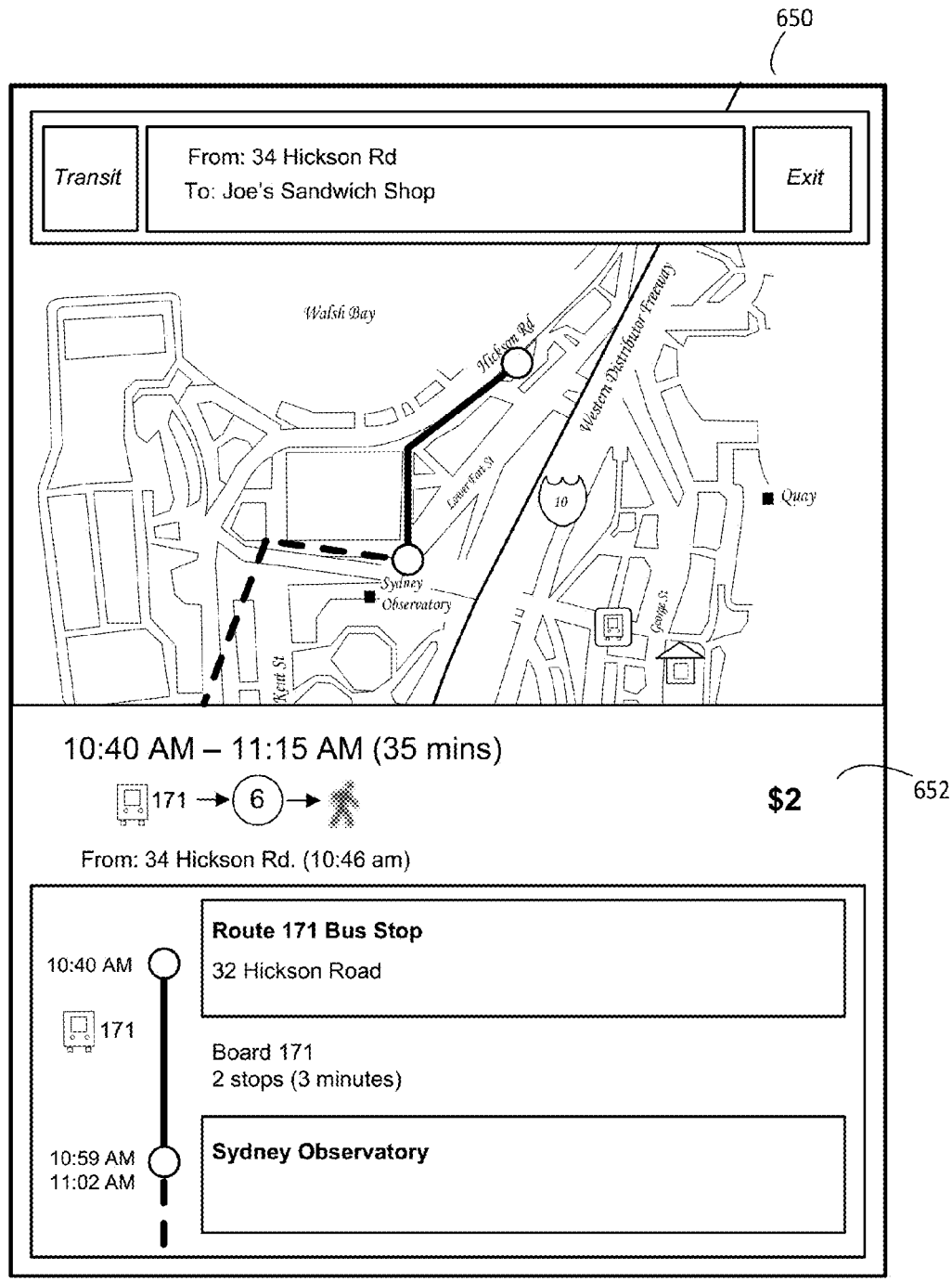
FIG. 7B illustrates an example transit directions informational sheet occupying a portion of the screen and partially overlaying a digital map, which the mapping application of FIG. 1 may display when the user selects one of the options via the menu of FIG. 7A.

Referring to FIG. 7B, when the user selects one the routes, the mapping application 14 may display a screen 650 in which a route is displayed schematically over a digital map, and a detailed route card 652, which may be larger than a route summary card 612-616. In addition to the overview of transit directions, the detailed route card 652 may include a scrollable area listing each step of the directions. In an implementation, some of the stops and steps are selectable for a more detailed view.

Figure 8A:
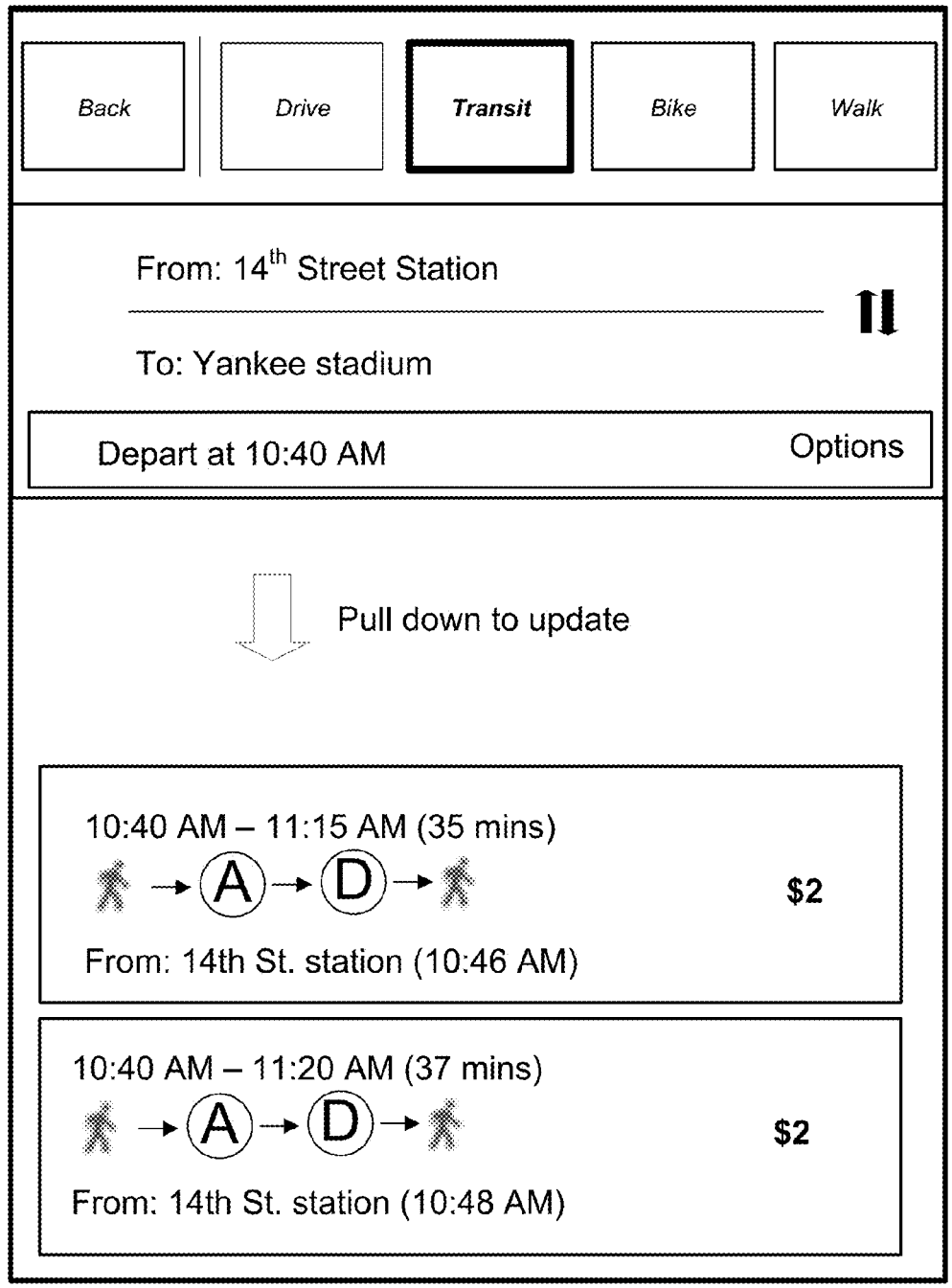
FIGS. 8A-C illustrate an example pull-down interface for updating transit directions, which the mapping application of FIG. 1A may implement.
Figure 8B:
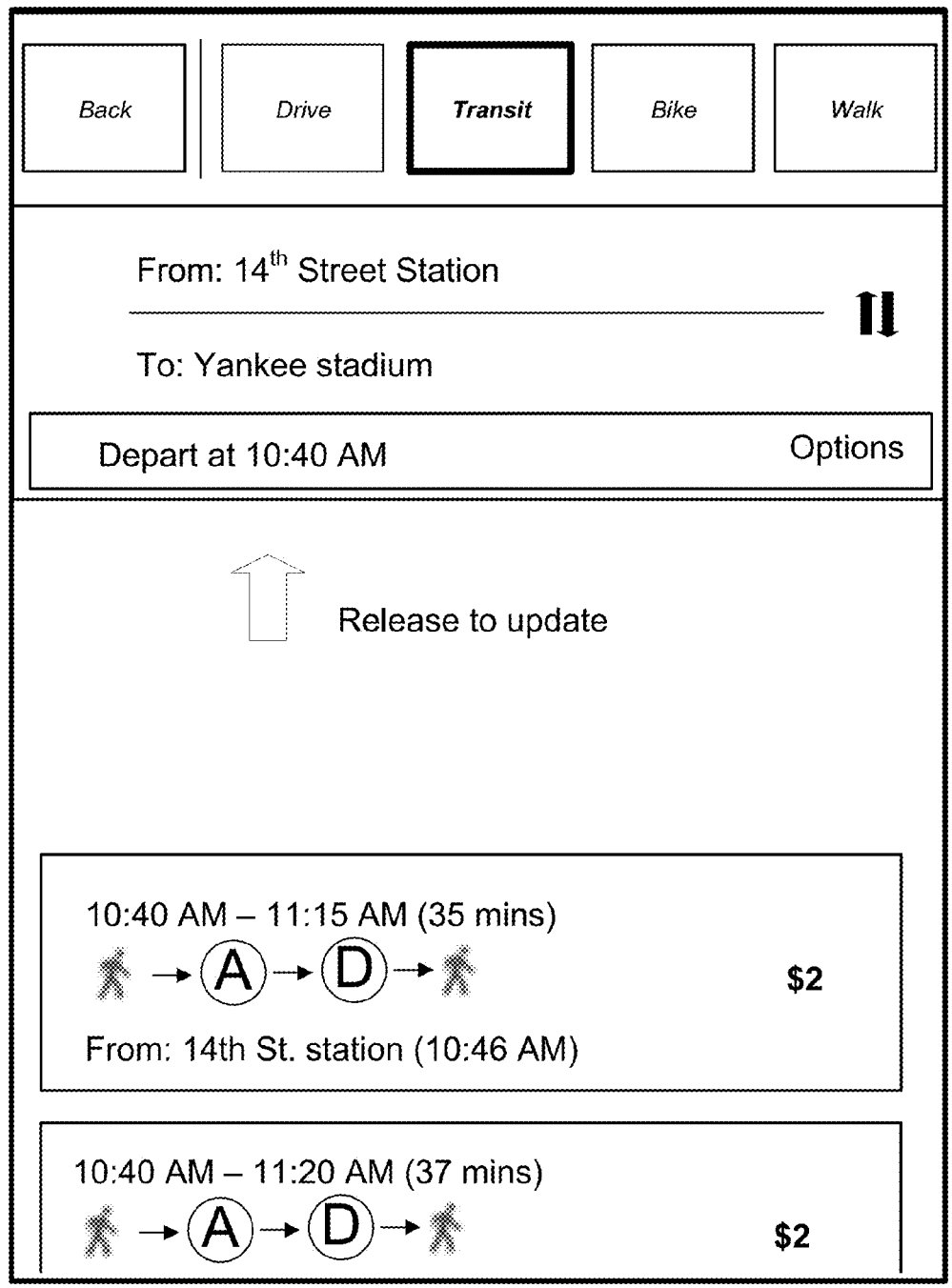
Figure 8C:
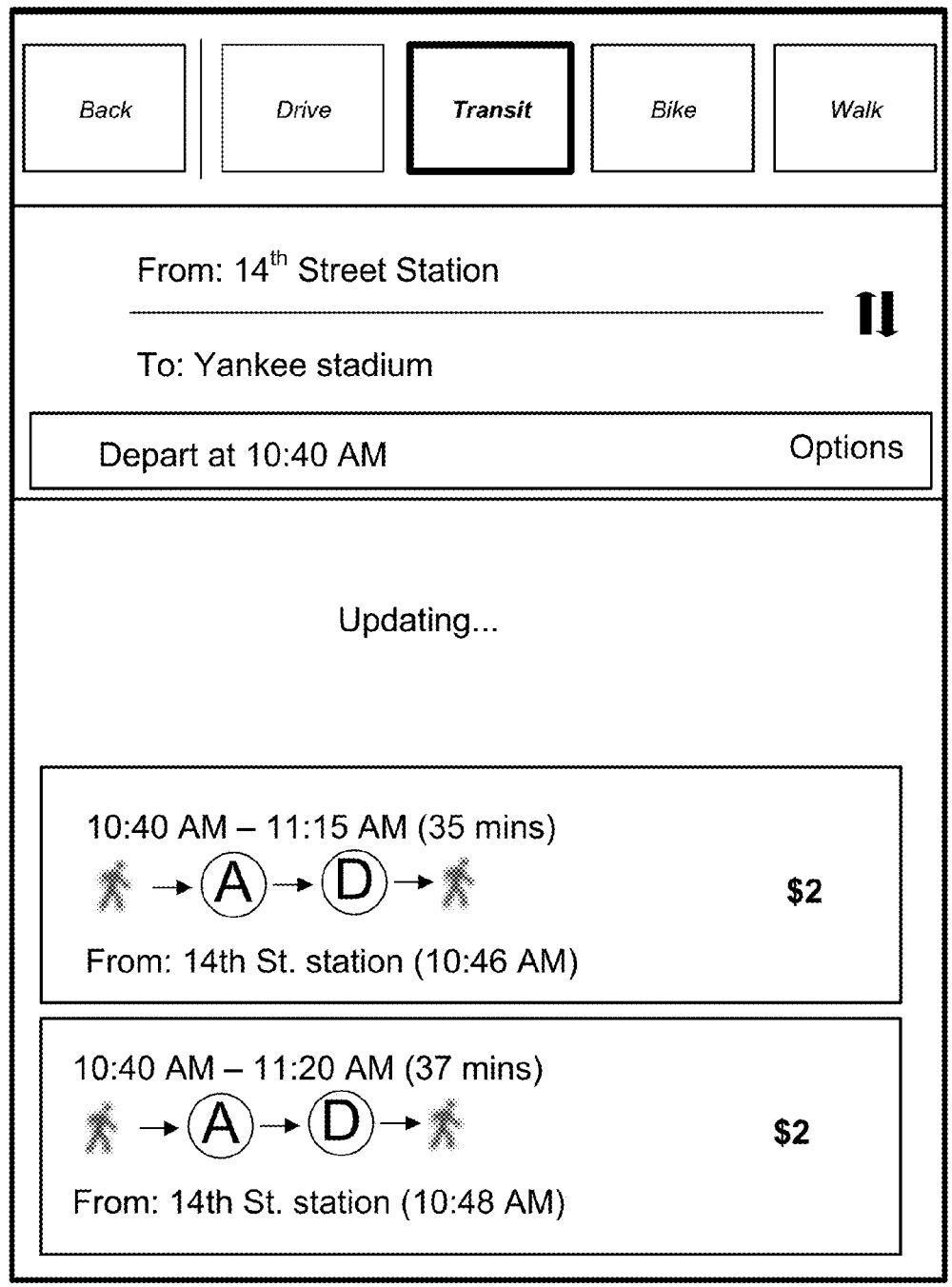

In one implementation, the mapping application 14 allows the user to update the route cards, such as the route summary cards 612-616 of FIG. 7A, with fresh results by pulling the cards down and releasing the card after a predefined time period. For clarity, this procedure is illustrated in FIGS. 8A-8C. In other implementations, the mapping application 14 refreshes the results automatically or provides a button for the user to trigger a refresh, for example. It is noted that during a refresh procedure, the mapping application 14 does not modify the sheet that includes the From and To fields, the time selection, etc. Thus, the user can still see the source and the destination of the route during the update.

Figure 9:
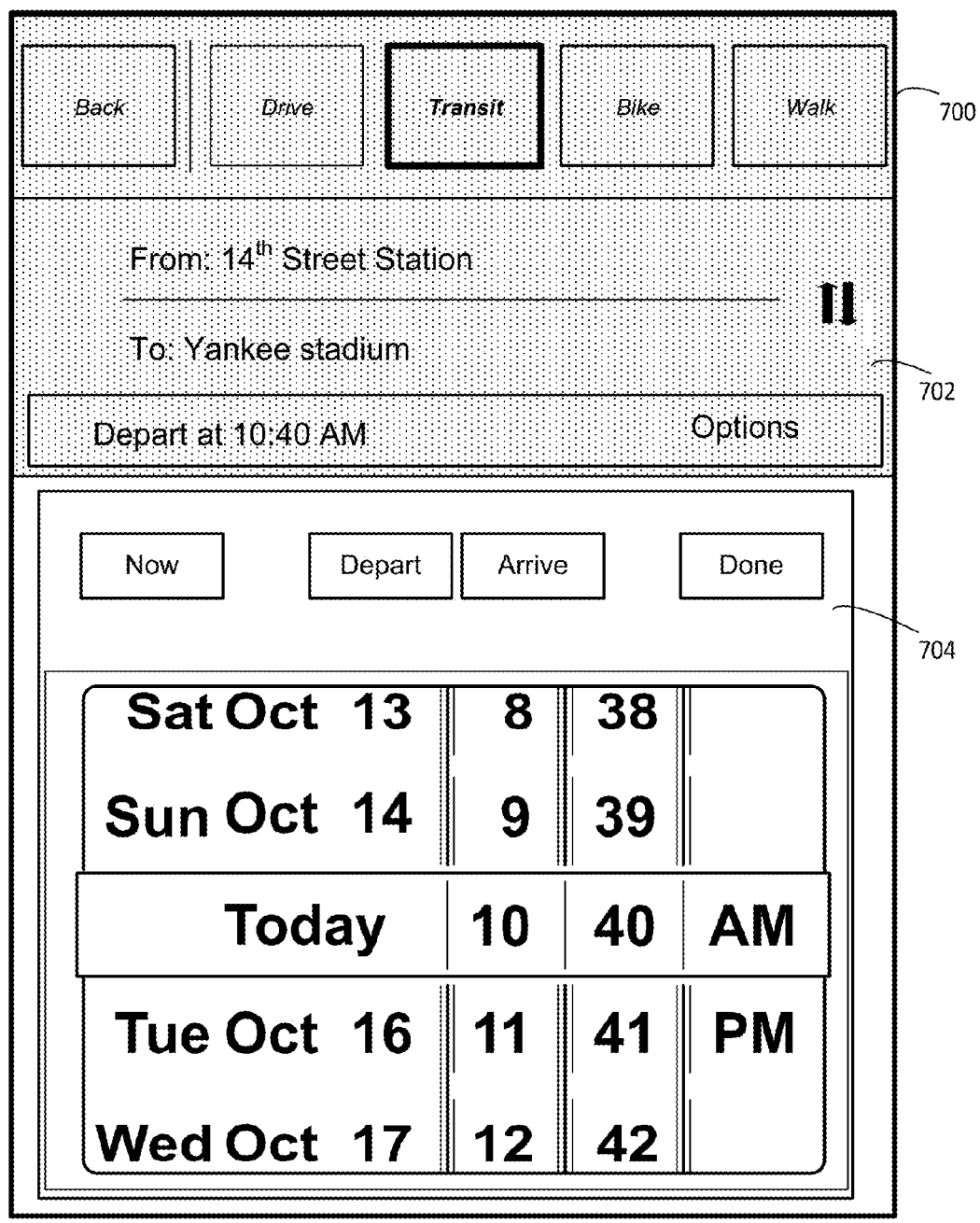
FIG. 9 illustrates an example interface for changing time parameters for transit directions, which the mapping application of FIG. 1A may implement.

As a more specific example, FIG. 9 illustrates a screen 700 in which sheet 702 is displayed the same but is greyed-out, whereas a time-selection barrel 704 is displayed in an interactive manner.

Figure 10A:
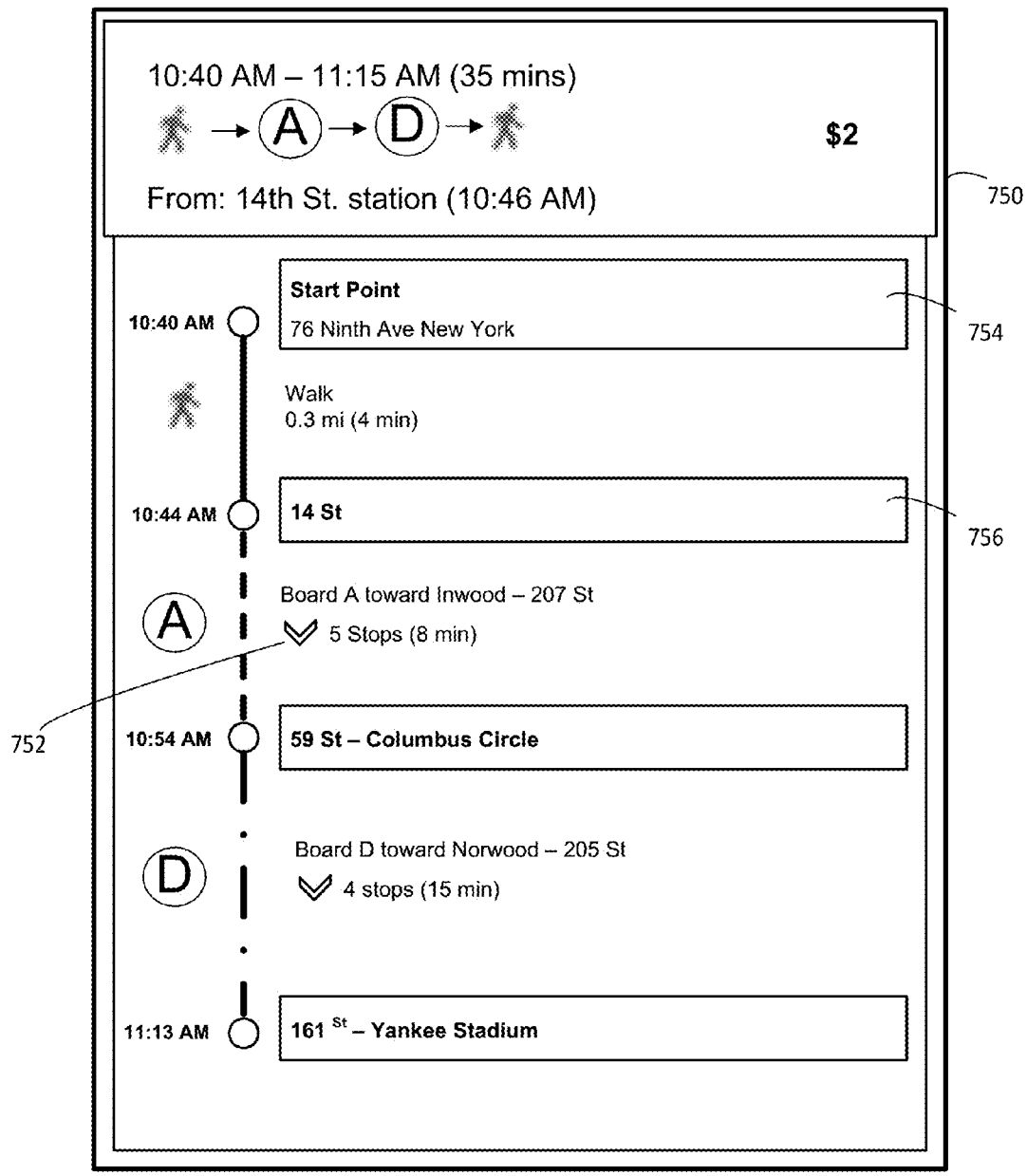
FIGS. 10A and 10B illustrate an example expandable listing of transit directions, which the mapping application of FIG. 1A may implement.
Figure 10B:
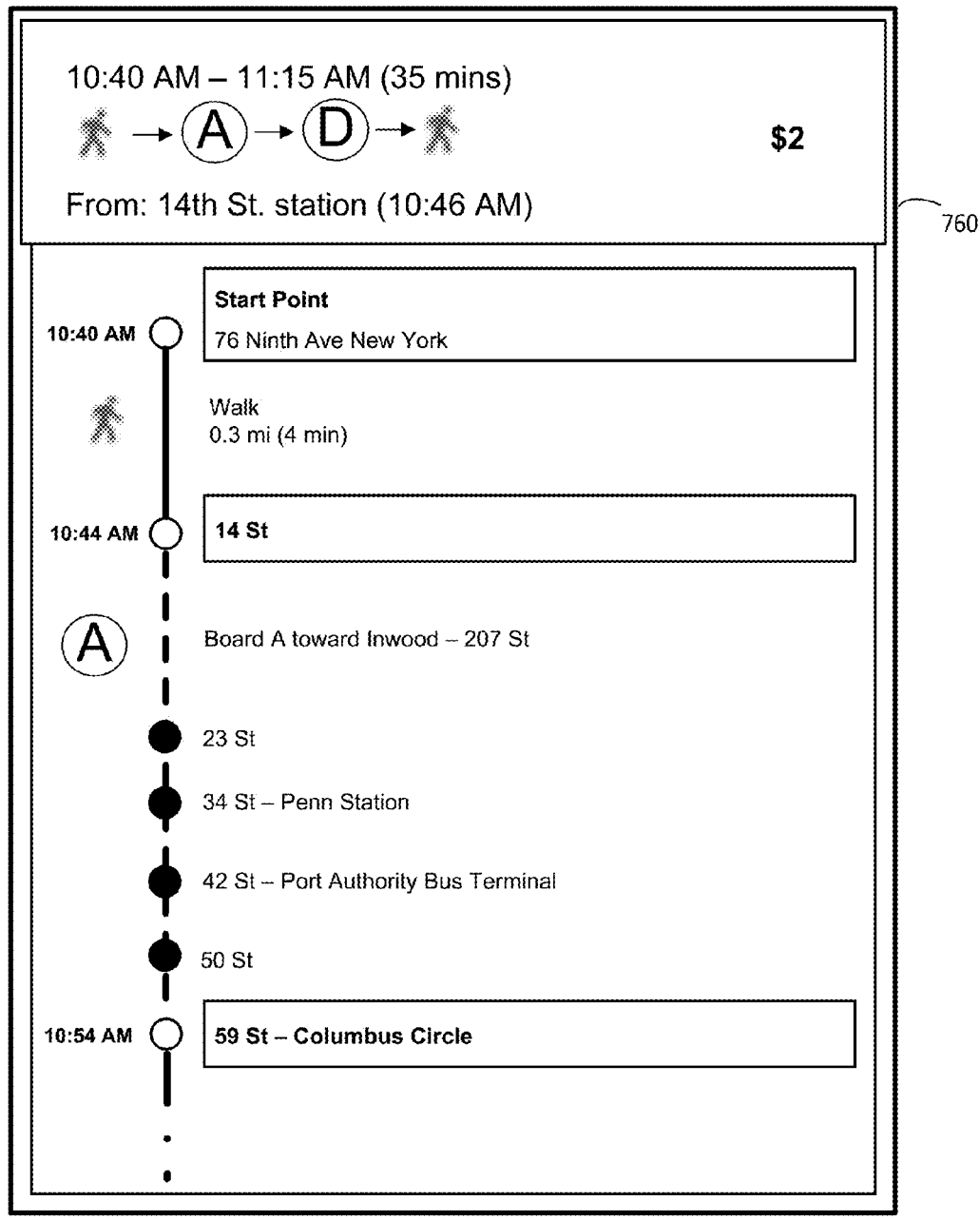

Now referring to FIGS. 10A and 10B, screens 750 and 760 include example expandable listings of transit directions, which the mapping application 14 may display when the user selects one of the options. In these screens, transit lines may be highlighted using the corresponding colors of the providers (e.g., using the colors of subway lines of the municipality).

Figure 10C:
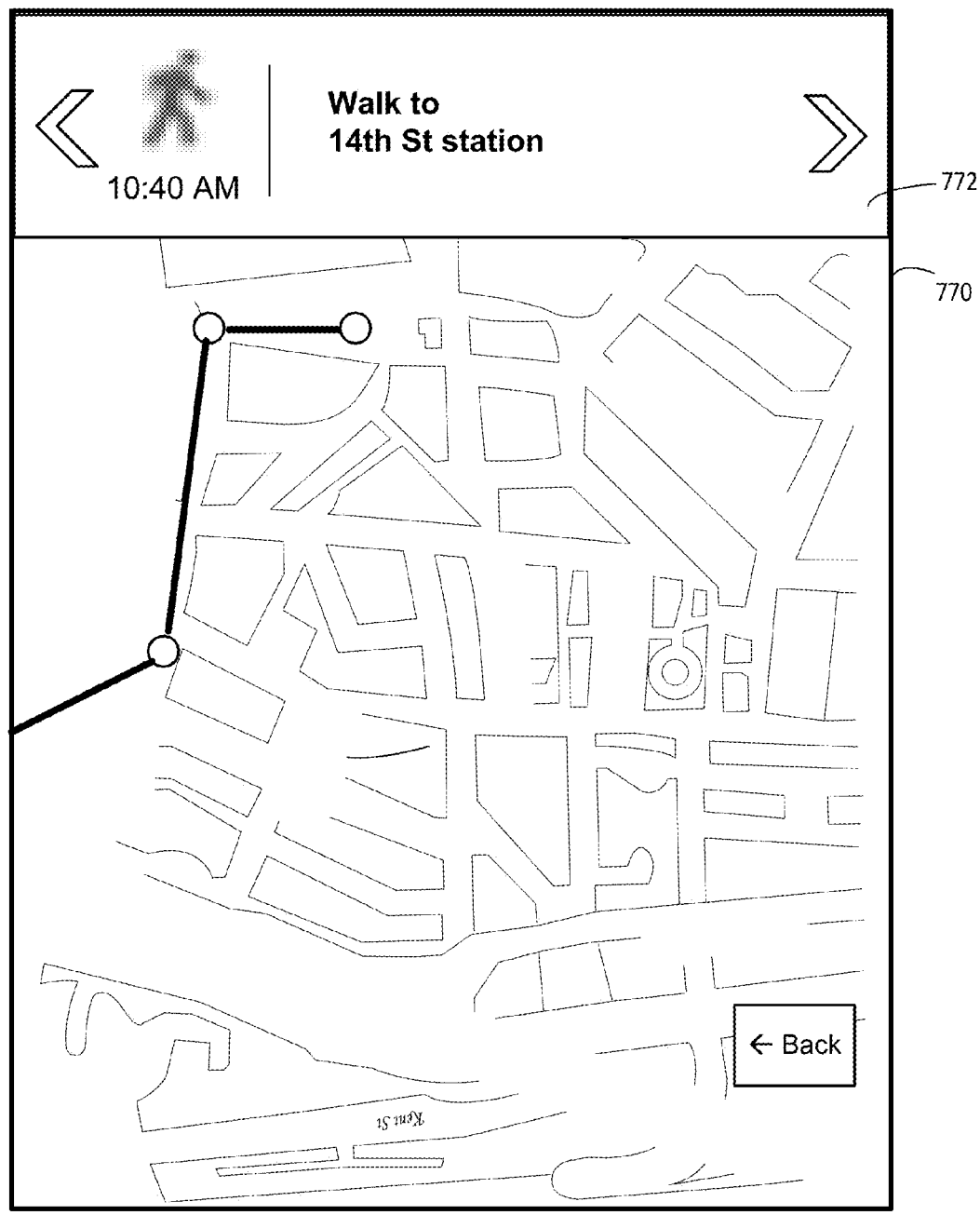
FIG. 10C illustrates an example interface for stepping through navigation directions, which the mapping application of FIG. 1A may implement.

The user can click on an expansion button 752 to bring up the details of the corresponding step, as illustrated in FIG. 10B. Then, as illustrated in FIG. 10C, the user can step through the directions by swiping a directions step card 772 left or right.

For some of the stations listed in informational cards 754, 756, etc., the mapping application 14 may display an informational card listing such information as, for example, name of the station, address, save & share buttons, service alerts, a street view photograph, etc. In one implementation, the mapping application 14 displays a map in a fixed place (e.g., at the top of the screen) and displays scrollable information about the station below. This layout may be generally similar to the screen of FIG. 5C, for example. Further, the available forms of transit can be grouped using additional cards, with each card showing available lines, and with each line showing the next N upcoming departures. Still further, the mapping application may provide a button to request additional schedules.

The mapping application 14 also may configure informational cards according to the type of selected transport and other types of context: for example, more departures may be requested for buses than for trains. On the other hand, for walking directions, the mapping application 14 may not display some of the buttons provided for buses or trains.

XI. Providing Multiple Route Options on a Portable Device

Referring back to FIG. 10A, when multiple route options are returned in response to a search for directions, the user can select the desired route, so that the details occupy most of the screen when needed, and inspect different options by swiping left or right. The mapping application 14 also may highlight traffic on the map portion of the screen (see, for example, FIG. 7B) along the route for certain zoom levels and activates the entire traffic layer (i.e., for the entire viewport) when the user zooms out beyond a certain level. When the user selects a new route, traffic along the new route is immediately shown. The highlighted route on the map also gets updated when the informational card changes.

XII. Automatically Re-Styling Map Elements During Turn-by-Turn Navigation

In general, in navigation mode, the mapping application 14 provides a sequence of instructions, each displayed in a respective box overlaying the map. The user swipes left and right to view the previous step or the next step, respectively. Every time a new turn is revealed, the digital map may automatically zoom into that turn. To "celebrate" arrival at the destination, the virtual camera may be spun about the destination point.

In some implementations, the mapping application 14 automatically assigns different priorities to interactive icons. For example, the mapping application 14 may first display a digital map with certain smart map icons but, when the user requests navigation instructions, the mapping application 14 may set a new threshold to eliminate some of the information along the route. In other words, the mapping application 14 removes information the user is less likely to need during navigation. Further, the mapping application 14 may make some of the labels larger (e.g., relevant labels related to parts of the route or places near the route). Still further, the mapping application 14 may remove building footprints during navigation.

The mapping application 14 may selectively enter the follow mode during navigation to automatically pan the digital map as the portable client device 12 moves.

XIII. Reporting a Problem

In some implementations, the mapping application 14 recognizes a shake gesture, characterized by sudden or abrupt movement of the device 12, as a request to report a problem. In particular, the mapping application 14 may determine the context in which the shake gesture is detected and provide a dialogue box for reporting the problem according to the context. Thus, for example, shaking the device 12 when the mapping application 14 displays an informational sheet for a particular location configures the dialogue box for reporting a problem related to the data in the informational sheet (e.g., wrong business hours, wrong telephone).

XIV. Updating the Order of Informational Sheets

In some implementations, the search results manager 93 operating in the mapping application 14 (or another suitable component) efficiently manages the order of informational sheets to reduce the number of swipes or clicks a user needs to perform to reach the desired sheet. For example, after the user submits a term for geographic searching, such as "pizza," "hardware store," or "theater," the mapping application 14 receives an ordered list of search results. A typical search result may include, for example, the location of the corresponding business or other geographic entity and the name of the geographic entity. In some implementations, and when relevant, the search result also includes business information such as business hours, the number and type of reviews, price range, etc. A search result may correspond to a location within the currently displayed viewport or outside the currently displayed viewport but within a certain distance from the center of the digital map or the current location. The distance may be dependent on the zoom level. The search results may arrive at the mapping application 14 with priority information to define an ordered list.

Figure 11A:
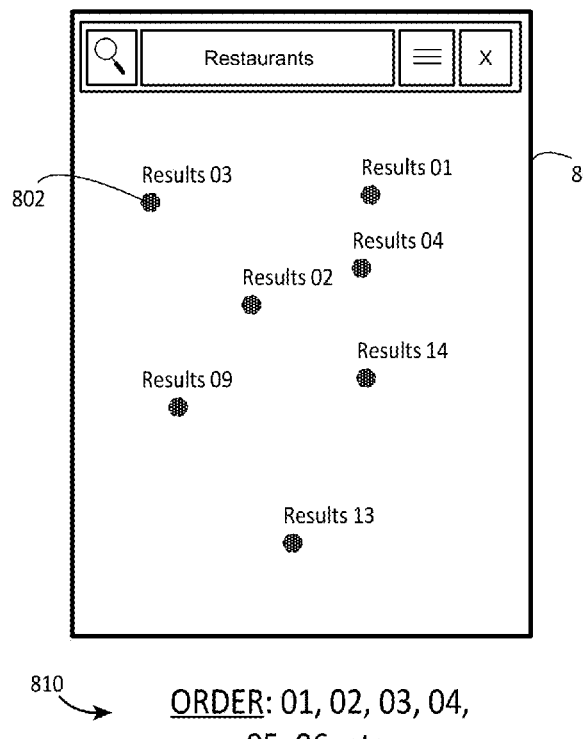
FIG. 11A illustrates an example ordered list of geographic search results, which the mapping application of FIG. 1A may receive from a network server in response to a user query.

In the scenario illustrated in FIGS. 11A-E, the mapping application 14 receives a ordered list 810 of N search results. Referring first to FIG. 11A, a screen 800 includes indicators 802 for several of the search results corresponding to locations within the currently active viewport. It is noted that some of the search results are outside the active viewport and accordingly are not visible in the screen 800. The initial order of the list 810 is Results 01, Results 02, . . . Results N, as indicated below the screen 800 in FIG. 11A.

Figure 11B:
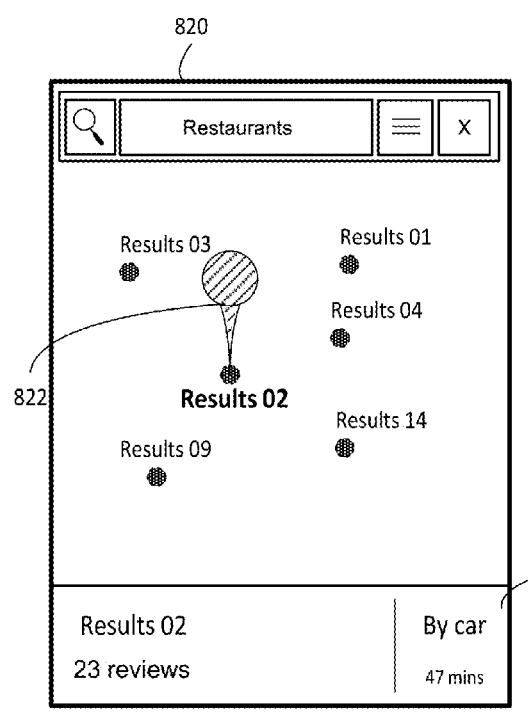
FIG. 11B illustrates the list of FIG. 11A, modified in view of the selection of one of the search results by the user.

In the scenario illustrated in FIG. 11B, the user activates Result 02, and the mapping application places a location marker 822 over the indicator corresponding to Result 02 and activates a compact informational sheet 824. The mapping application 14 updates the list 810 as illustrated in FIG. 11B by placing item Result 02 at the head and removing this item from its original position. In this case, item Result 02 also corresponds to the current position of a list pointer.

The user may place her finger on the compact informational sheet 824 and swipe and left to traverse the search results in the order specified by the list 810. For example, when the screen 820 is displayed, the user can swipe left to select Result 01, swipe again to then select Result 03, etc. According to one implementation, if the user swipes right when the screen 820 is displayed, the last item in the list 810 may be selected. In this sense, the list 810 can be viewed as a circular list. In another implementation, however, the list 810 is not circular, and the user can swipe in only one direction once the end of the list 810 is reached. When a new item in the list 810 is selected, the mapping application may automatically update the digital map by placing the marker 822 over the indicator corresponding to the newly selected search result. If necessary, the mapping application 14 automatically repositions the viewport (e.g., pans, changes the zoom level, etc.).

Now referring to FIG. 11C, when the user taps on Results 14, the mapping application 14 (*i*) automatically unselects Results 02, (*ii*) places the marker 822 over Results 14, (*iii*) updates the compact informational sheet 824 to display information about Results 14, and (*iv*) updates the list 810 to add item Results 14 to the tail of the sub-list of locations viewed by the user. More particularly, items Results 02 and Results 14 define the sub-list of viewed search results, and item Results 14 corresponds to the current position of the list pointer. Item Results 14 is also removed from its original position in the list 810. The remaining items Results 01, Results 03, Results 04, etc. follow the item at the current position of the list pointer. As a further example, the user may then tap on Results 01, and the mapping application 14 in response updates the location marker 822, the compact informational sheet 824, etc. The list 810 is updated as illustrated in FIG. 11D.

Figure 11E:
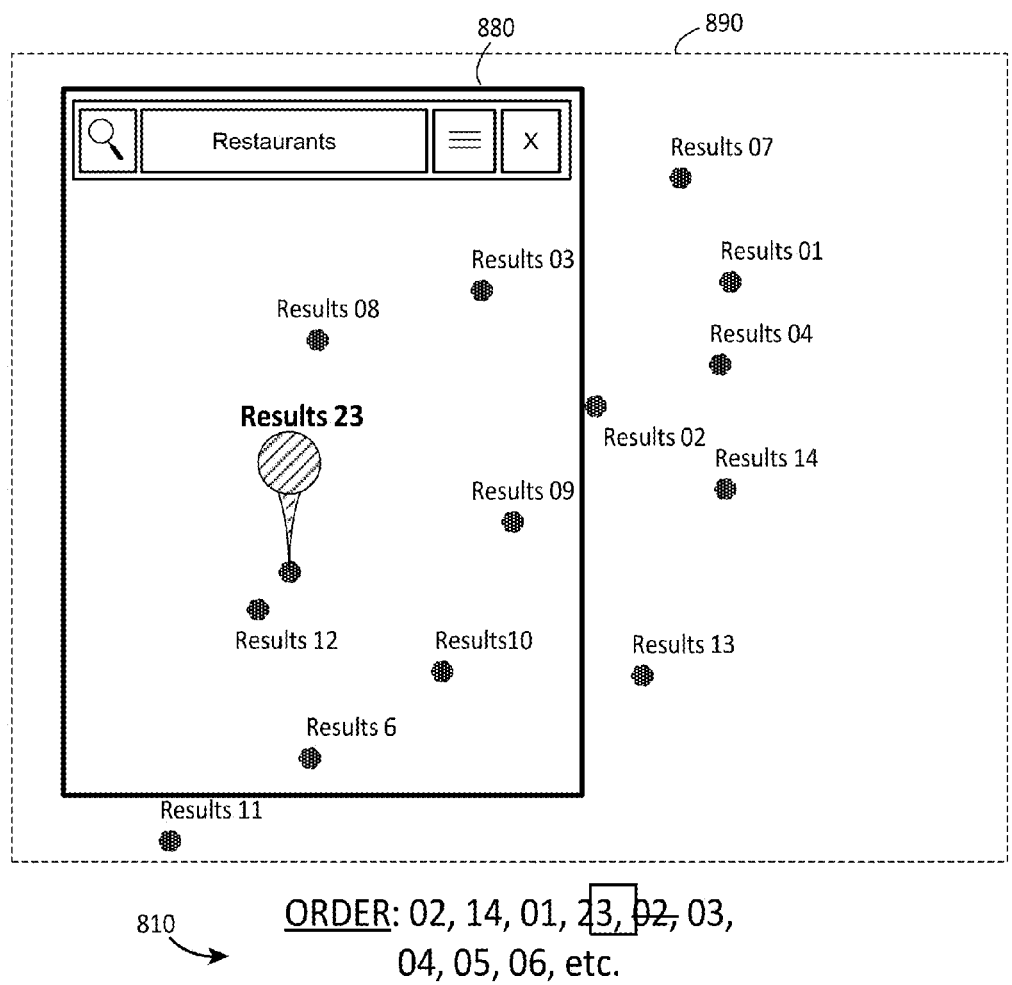
FIG. 11E illustrates the list of FIG. 11D, modified in view of the user selecting a result outside the current viewport.

Next, FIG. 11E illustrates the scenario in which the user selects Results 23 which is located outside the current viewport. The mapping application 14 again updates the list 810 to place item Results 23 at the tail of the sub-list of viewed search results, removes the item from its original location, and associates the current position of the list pointer with item Results 23.

In other words, when the user selects an item on the map, the list is automatically rearranged to place all the items previously selected by the user on one side of the currently selected item (e.g., with the most recently selected item being closes to the currently selected item) and the other items on the other side (e.g., in the ascending original order). In this manner, the options reflect both the interaction history and the original ranking of the features.

Referring generally to FIGS. 11A-E, the user sometimes may places his fingers on the touchscreen to as to cover a relatively large area at once. If the area includes more than one indicator 802, the indicator may be selected according to the rank of the corresponding location relative to other locations, rather than proximity of the indicator 802 to the center of the area of contact, for example. Thus, if the area of contact with the user's finger includes both Results 02 and Results 14, the mapping application 14 may select Results 14 if the rank of the corresponding location is higher than the rank of location corresponding to Results 02, even the center of the area of contact is closer to Results 02. The rank can correspond to any suitable metric or a combination of metrics, such as the percentage of positive reviews, for example.

XV. Providing Suggestions to the User

Figure 12:
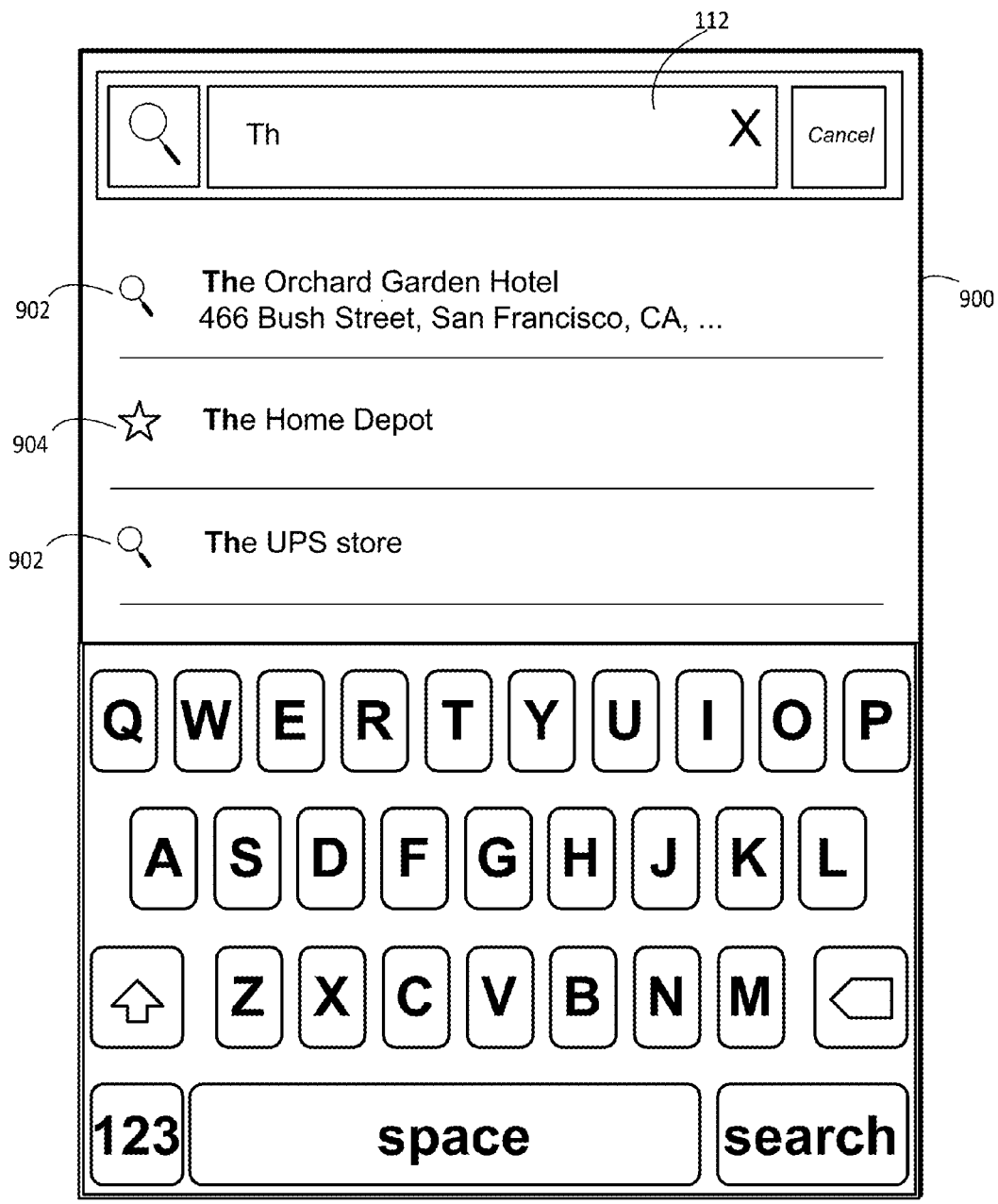
FIG. 12 illustrates a list of suggestions with icons identifying the respective sources, which the mapping application of FIG. 1A may display.

When the autosuggest server 26 provides automatic suggestions to the client device 12, the mapping application 14 may indicate the respective sources of these suggestions using icons, for example. FIG. 12 illustrates a screen 900 in which the user begins typing into the input field 112, and the mapping application 14 receives and displays automatic suggestions that are consistent with the partial input. Icon 902 may indicate that the search results comes exclusively or primary from the "normal" search, whereas icon 904 may indicate that the corresponding search result is a location which the user previously approved. In other scenarios, a certain icon may indicate previously searched-for places, another icon may indicate starred places, etc.

Generally with respect to automatic suggestions, the mapping application 14 can "emphasize" different points in source and destination boxes and, more generally, configure autosuggest boxes differently for different contexts. For example, when the user inputs endpoints for driving directions via "from" and "to" input fields, the directions and navigation controller 92 can configure these input fields differently according to respective input field profiles 95 (see FIG. 1B) to generate more accurate predictions. As a more specific example, in the morning, the "from" field can be configured so that the suggestion is more likely to reflect the user's home or a place near the user's home. On the other hand, the "from" field at night can be configured so that that the suggestion is more likely to reflect the user's place of work or a place near the place of work.

Further, in some implementations, the mapping application 14 provides suggestions even before the user types anything at all into a text input field. To provide a suggestion, the mapping application 14 may utilize such signals as, for example, the user's current location, time of day, time of year, the user's "starred" locations, etc.

XVI. Example Methods for Providing Improved User Experience

FIGS. 13-19 illustrate several example methods which can be implemented to allow users to interact with a digital map more easily and efficiently. These methods are implemented in the mapping application 14, according to some example implementations. However, in general these methods can be implemented in any suitable software application executing on an individual computing device or a cloud.

Figure 13:
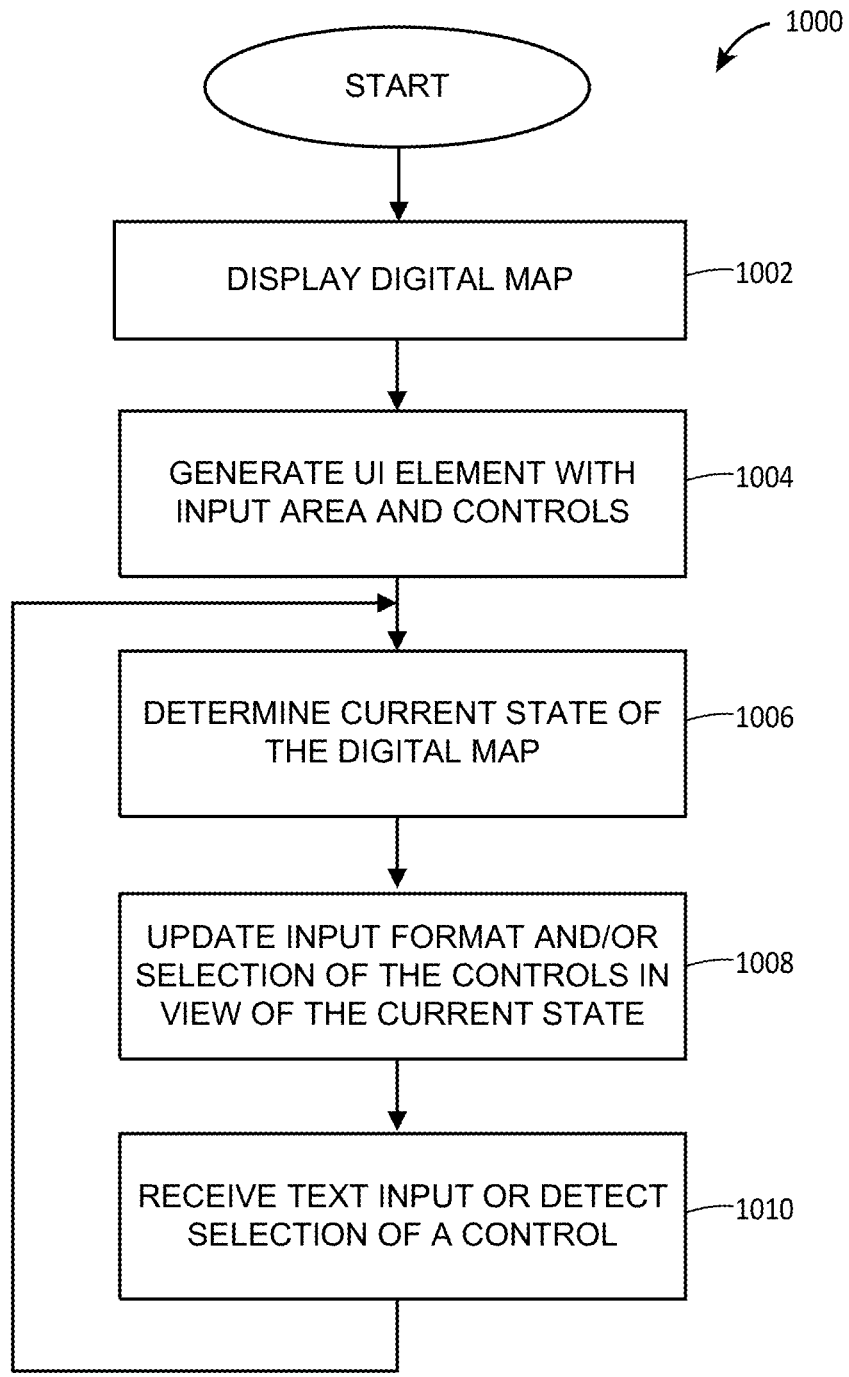
FIG. 13 is a flow diagram of an example method for providing user interface for interaction with a digital map, which the mapping application of FIG. 1A may implement.

FIG. 13 is a flow diagram of an example method 100 for providing user interface for interaction with a digital map. At block 1002, a digital map of a geographic area is displayed. A UI element with an input area and one or more interactive controls is provided at block 1004. The UI element overlays the digital map according to some implementations.

Next, at block 1006, the current state of the digital map is determined. For example, the digital map may be in a default state, a search state, a directions state, etc. The format of the input field or box of the UI element is automatically updated at block 1008. For example, the format may change from a single-line input to a multi-line input. Further, at block 1008, the selection of controls available in the UI element also can be updated. For example, a list button may appear to allow the user to view complete search results, for example. User input via the input field and/or selection of one or more controls are received at block 1010.

Figure 14:
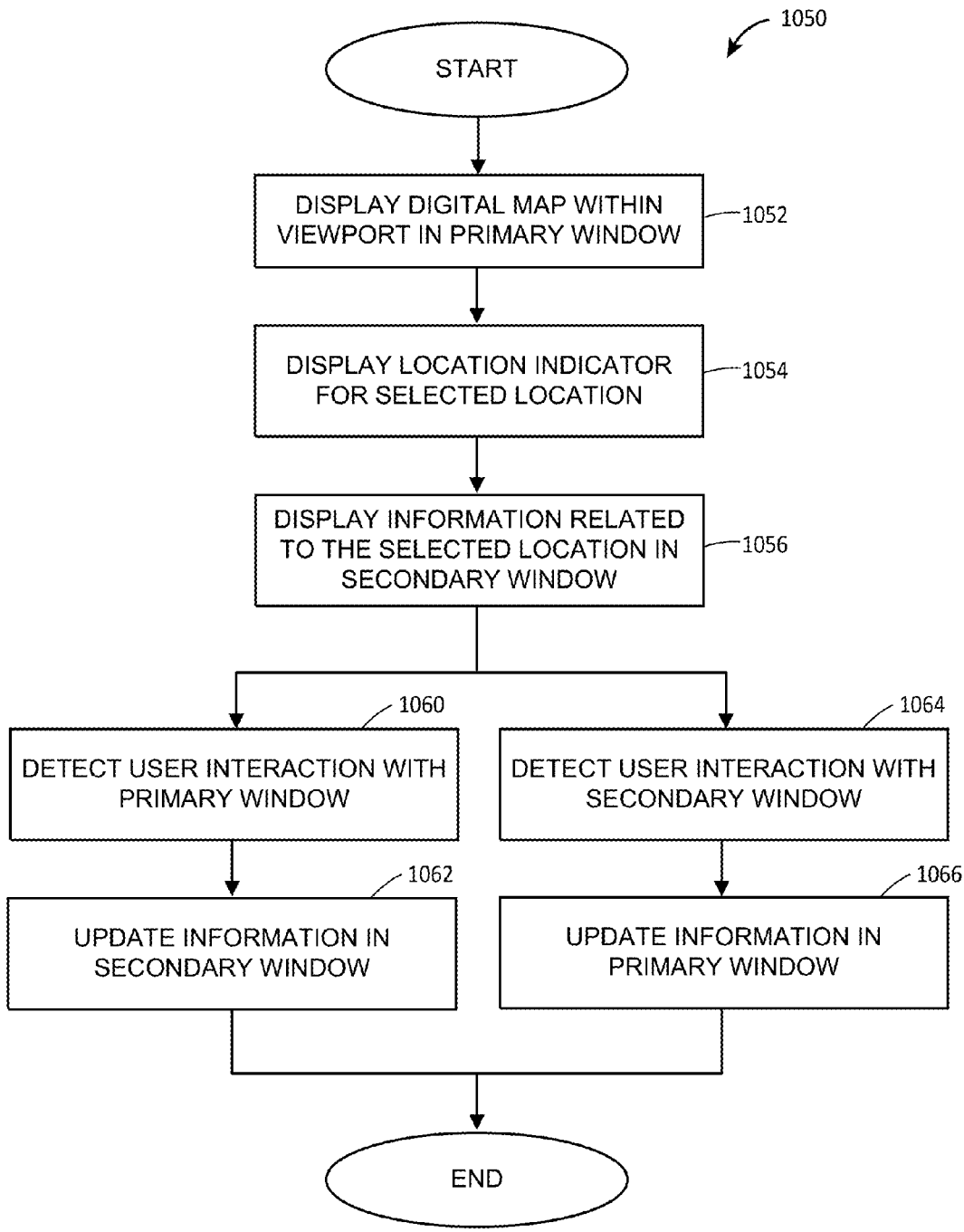
FIG. 14 is a flow diagram of an example method for efficiently managing screen real estate, which the mapping application of FIG. 1A may implement.

Next, FIG. 14 is a flow diagram of an example method 1050 for efficiently managing screen real estate. The method 1050 begins at block 1052, where an interactive digital map of a geographic area is displayed within a viewport of a primary window. A location indicator correspond to a selected location is displayed at block 1054. The selected location can correspond to a geographic search result, for example, or a location corresponding to an interactive map icon provided on the digital map. Next, at block 1056, information related to the selected location is displayed within a secondary window.

If, at block 1060, user interaction with the digital map displayed in the primary window is detected, information in the secondary window can be automatically updated. For example, if the user taps on an interactive map icon, information about the selection location can be automatically displayed in the secondary window without receiving an additional user command (block 1062). On the other hand, if user interaction with the secondary window is detected at block 1064, the primary window can be automatically updated at block 1066 without receiving an additional user command. For example, the zoom level or the position of the viewport in the primary window can be updated. In another scenario, the location marker or another type of marker can be automatically repositioned in the primary window when the user selects a new informational sheet (or a new generation of the informational sheet in the secondary window).

Figure 15:
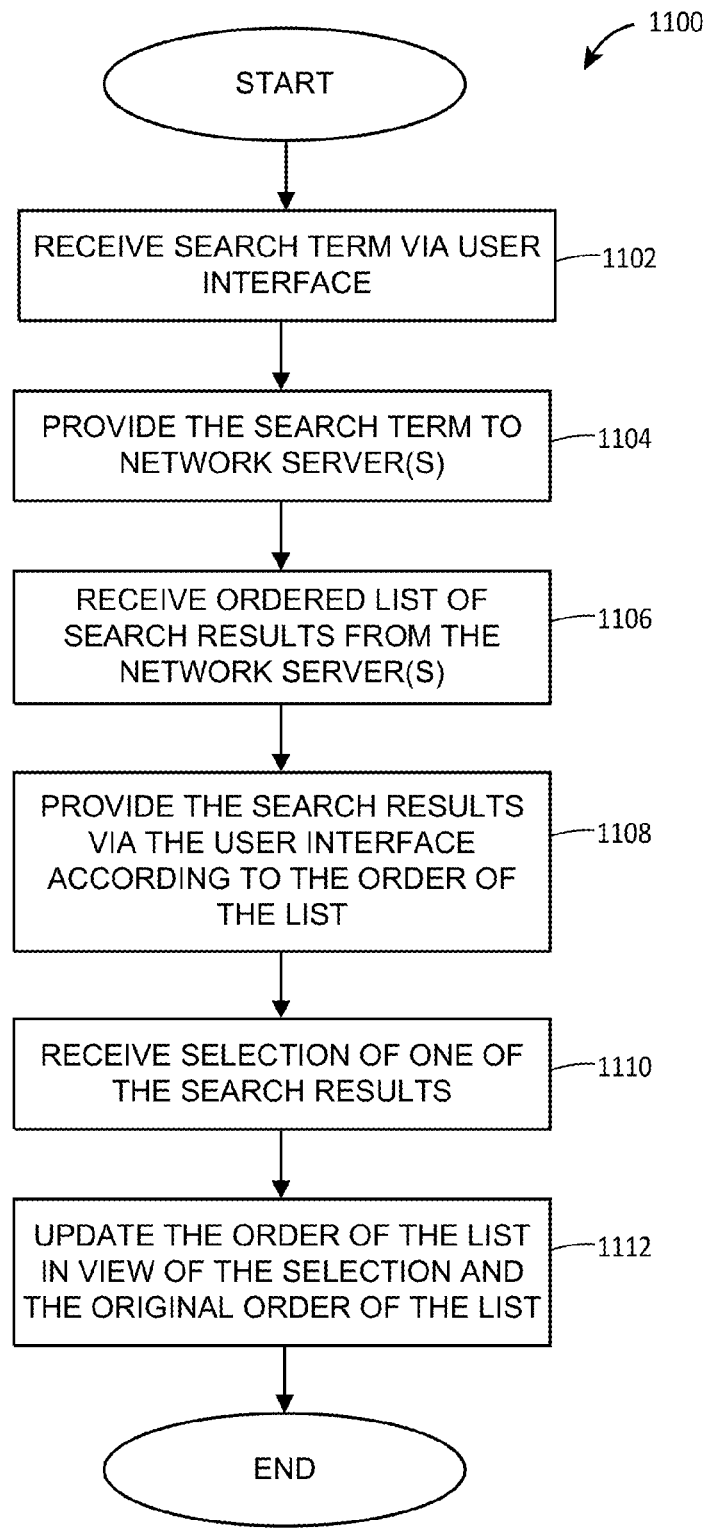
FIG. 15 is a flow diagram of an example method for displaying search results, which the mapping application of FIG. 1A may implement.

FIG. 15 is a flow diagram of an example method 1100 for displaying search results, which begins with receiving a search term via a user interface at block 1102. Next, at block 1104, the search term is provided to a network server. The search term can be explicitly or implicitly related to a geographic search.

At block 1106, an ordered list of search results is received from the network server. Some or all of these search results are provided via the user interface, depending on the position of the viewport (block 1108). For example, each search result can be depicted as an indicator (e.g., a dot, a pin, another type of icon) over a digital map, with the currently selected search result optionally being displayed in an informational sheet. At block 1110, a selection of one of the search results is received. The user can tap or click on the corresponding indicator, for example.

At block 1112, the order of the list of search results is updated in view of the selection and the original order of the list. As discussed above with reference to FIGS. 11A-E, the currently selected location can be placed at the tail of a sub-list of items visited by the user, with the rest of the list following the currently selected location according to the original order.

Figure 16:
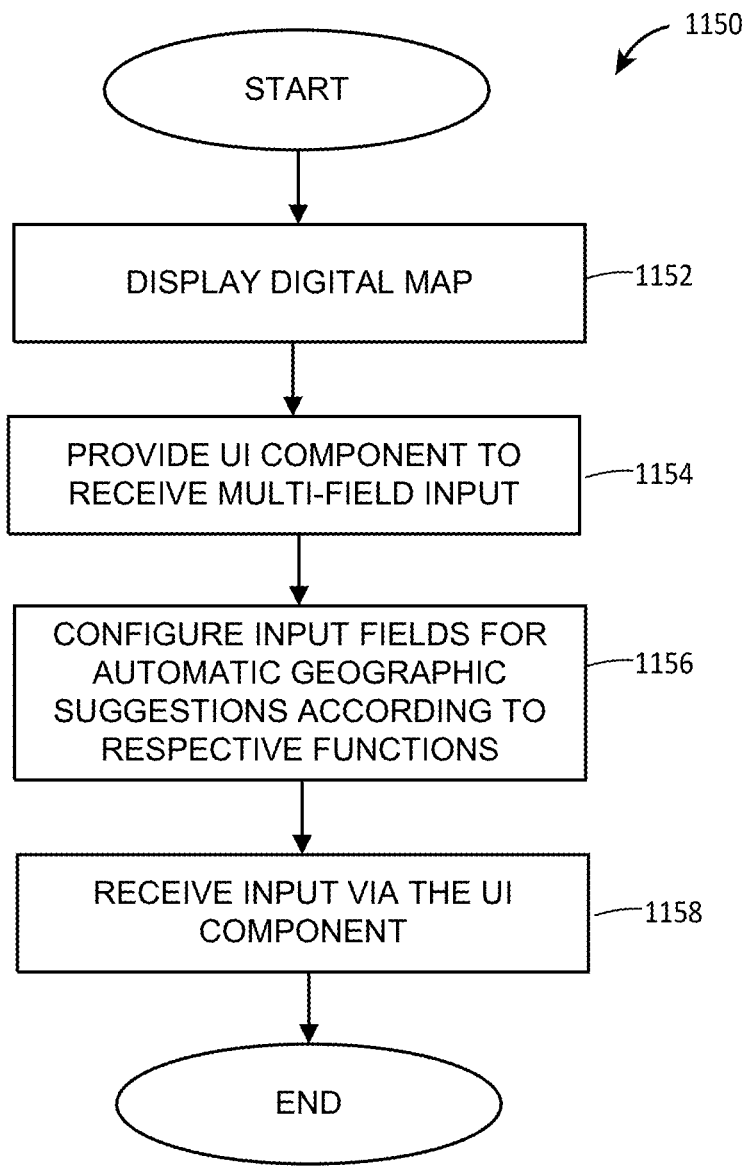
FIG. 16 is a flow diagram of an example method for providing context-specific geographic suggestions, which the mapping application of FIG. 1A may implement.

Now referring to FIG. 16, an example method 1150 for providing context-specific geographic suggestions begins at block 1152, where a digital map is displayed. At block 1154, a UI element for receiving multi-field input is displayed. The UI element can be a dialogue box for specifying the origin and the destination of a trip that can be displayed in a directions or navigation mode, for example.

At block 1156, the input fields are automatically configured for input and automatic suggestions, so that each input field is configured individually according to its function. For example, the "to" and "from" fields are configured differently to make certain suggestions more likely.

Figure 17:
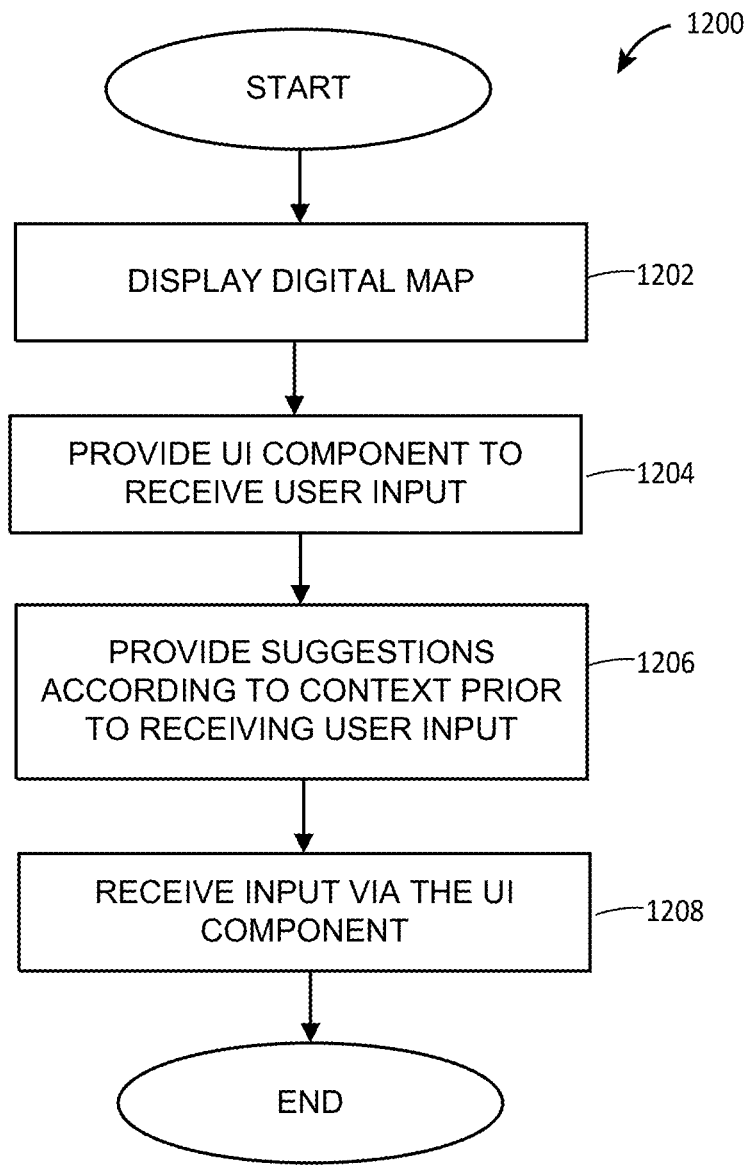
FIG. 17 is a flow diagram of an example method for proving geographic term suggestions, which the mapping application of FIG. 1A may implement.

FIG. 17 illustrates an example method 1200 for proving geographic term suggestions. At block 1202, a digital map is displayed. At block 1204, a UI element for receiving user input is displayed. Suggestions, which may be context-specific, are automatically provided at block 1206 prior to receiving user input. User input is received (or confirmed, if the user chooses to accept a suggestion) at block 1208.

Figure 18:
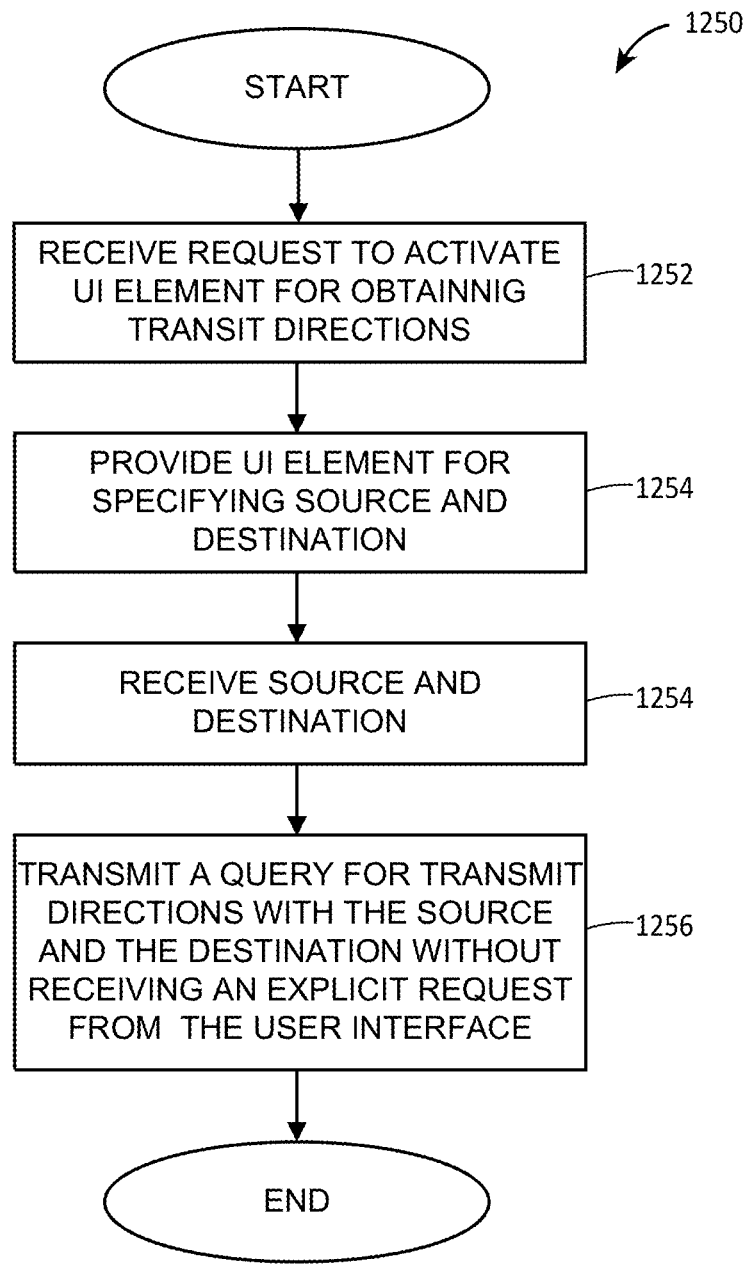
FIG. 18 is a flow diagram of an example method for providing transit directions, which the mapping application of FIG. 1A may implement.

Referring to FIG. 18, a method 1250 is for providing transit directions begins. At block 1252, a user request to activate a UI element for obtaining transit directions is received. For example, the user may activate an interactive icon in an omnibox. A UI element for specifying a source and a destination is provided at block 1254, and a source and a destination are received at block 1254. At block 1256, prior to receiving an explicit command from the user, a query is transmitted to a directions server with the source and the destination. In other words, the query is transmitted instantly upon the user completing input.

Figure 19:
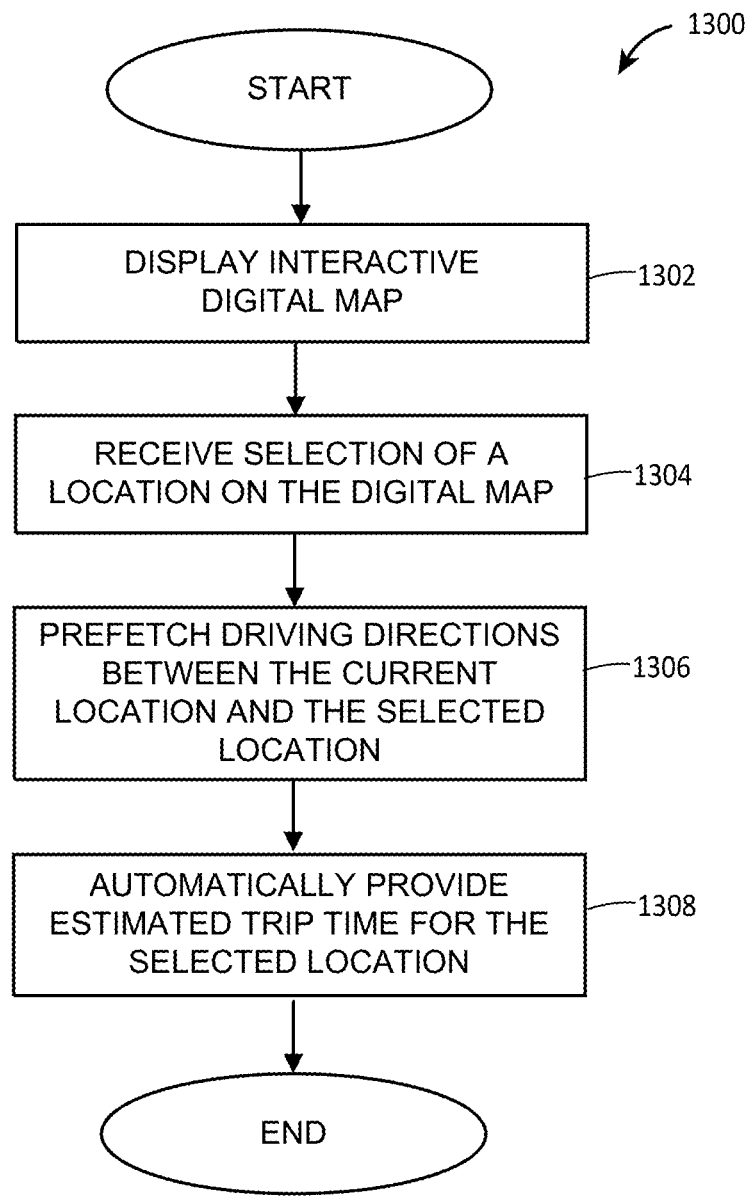
FIG. 19 is a flow diagram of an example method for providing information about a location, which the mapping application of FIG. 1A may implement.

FIG. 19 illustrates a method 1300 for efficiently providing information about a location. An interactive digital map of an area is displayed at block 1302. A selection of a location on the displayed digital map is received at block 1304. As one example, the user can tap on an icon or a location on the map for which information is available. At block 1306, driving directions to the selection location are automatically prefetched. The starting point for the driving directions can be the current user's location, for example. Alternatively, the starting point can be the user's home address or work address, for example. The request for driving directions is transmitted at block 1306 without previously receiving an explicit request for directions from the user. In other words, the driving directions are obtained in anticipation of a possible future request for such information from the user. At block 1308, an estimated trip time for the selection location is provided via the user interface. As one example, the estimated trip time can be displayed in a compact informational sheet partially overlaying the digital map.

In one implementation, the estimated trip time is received along with driving directions from a directions server. In another implementation, the mapping application 14 calculated the estimated trip time locally using the received directions.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an efficient and intuitive user interface for navigating digital maps through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for efficiently providing information related to directions to a user, the method comprising:
   providing an interactive digital map of a geographic area via a user interface of the computing device;
   receiving, by one or more processors via a user interface of the computing device, a selection of a point on the digital map, wherein the selected point corresponds to a selected location within the geographic area;
   in response to receiving the selection of the point and without receiving a request for directions from a user via the user interface, automatically obtaining an indication of a length of a trip between a current location of the computing device and the selected location, by the one or more processors; and
   displaying, via the user interface, the indication of the length of the trip along with the interactive digital map, including:
      determining, using the indication of the length of the trip, whether an estimated distance between the current location and the selected location is greater than a certain threshold value, and
      when the estimated distance is greater than the threshold value, displaying the estimated distance between the current location and the selected location as the indication of the length of the trip,
      otherwise, when the estimated distance is not greater than the threshold value, displaying an estimated duration of the trip as the indication of the length of the trip.

2. The method of claim 1, further comprising:
   subsequently to displaying the indication of the length of the trip, receiving a request for the step-by-step directions from the user via the user interface;
   in response to receiving the request, obtaining the step-by-step directions; and
   displaying the step-by-step directions via the user interface.

3. The method of claim 1, further comprising:
   in response to receiving the selection of the point and without receiving a request for directions from the user via the user interface, automatically obtaining step-by-step directions for travelling from the current location to the selected location.

4. The method of claim 3, further comprising:
   subsequently to obtaining the step-by-step directions, receiving a request for the step-by-step directions from the user via the user interface; and
   in response to receiving the request, providing the previously received step-by-step directions via the user interface.

5. The method of claim 1, wherein displaying the indication of the length of the trip includes generating a selectable informational card that overlays a portion of the digital map, wherein the informational card includes the indication of the length of the trip.

6. A non-transitory computer-readable medium storing thereon instructions for generating interactive digital maps via a user interface of a computing device disposed at a current location, wherein the instructions execute on one or more processors to:
   provide an interactive digital map of a geographic area via a user interface of the computing device;
   receive a search term via the user interface;

obtain a plurality of search results corresponding to the received search term, wherein each of the plurality of search results corresponds to a respective location within the geographic area;

automatically and without receiving a user request via the user interface, obtain indications of lengths of trips between the current location and the locations corresponding to the plurality of search results, including not obtain step-by-step directions for the trips;

provide, via the user interface, indications of the lengths of the trips along with the interactive digital map including: determine, using the indication of the length of the trip, whether an estimated distance between the current location and the selected location is greater than a certain threshold value; and (i) when the estimated distance is greater than the threshold value, display the estimated distance between the current location and the selected location as the indication of the length of the trip, otherwise, when the estimated distance is not greater than the threshold value, display an estimated duration of the trip as the indication of the length of the trip;

subsequently to providing the indications of the lengths of the trips, receive a selection of one of the plurality of search results via the user interface; and in response to receiving the selection, obtain step-by-step directions for travelling between the current location and the location corresponding to the selected search result.

7. The computer-readable medium of claim 6, wherein the instructions further execute on the one or more processors to: provide the step-by-step directions via the user interface.

8. The computer-readable medium of claim 6, wherein to display the indications of the lengths of the trips, the instructions are configured to generate an informational card overlaying a certain portion of the digital map, wherein the informational card includes information related to a currently selected one of the plurality of search results and the corresponding indication of the length of the trip.

9. The computer-readable medium of claim 8, wherein the instructions are further configured to update the informational card in response to the user selecting a new one of the plurality of search results.

10. The computer-readable medium of claim 6, wherein the instructions are configured to obtain the indications of lengths of trips in accordance with a last mode of transport selected by the user, wherein the mode of transport is selected from a group including driving, public transit, and walking.

11. The computer-readable medium of claim 6, wherein the instructions execute on one or more processors to receive the indications of lengths of trips and the step-by-step directions from a server via a communication network.

12. The computer-readable medium of claim 6, where the indications of the lengths of the trips are received from a server via a communication network along with the corresponding search results.

13. The computer-readable medium of claim 6, wherein to obtain the indications of the lengths of the trips, the instructions execute on one or more processors to request the lengths of the trips from a server via a communication network.

14. A computing device comprising:

one or more processors;

a user interface including a display device; and a non-transitory computer-readable medium storing thereon instructions that, when executed on the one or more processors, cause the computing device to:

provide an interactive digital map of a geographic area via the user interface, receive, via the user interface, a selection of a point on the digital map, wherein the selected point corresponds to a selected location within the geographic area, in response to receiving the selection of the point and without receiving a request for directions from a user via the user interface, automatically obtain an indication of a length of a trip between a current location of the computing device and the selected location, and display, via the user interface, the indication of the length of the trip along with the interactive digital map, including select one of an estimated distance of the trip or an estimated duration of the trip as the indication of the length of the trip for display, based on whether the estimated distance is greater than a certain threshold value.

15. The computing device of claim 14, wherein the instructions further cause the computing device to:

subsequently to displaying the indication of the length of the trip, receive a request for the step-by-step directions from the user via the user interface;

in response to receiving the request, obtain the step-by-step directions; and display the step-by-step directions via the user interface.

16. The computing device of claim 14, wherein the instructions further cause the computing device to:

in response to receiving the selection of the point and without receiving a request for directions from the user via the user interface, automatically obtain step-by-step directions for travelling from the current location to the selected location.

17. The computing device of claim 16, wherein the instructions further cause the computing device to:

subsequently to obtaining the step-by-step directions, receive a request for the step-by-step directions from the user via the user interface; and in response to receiving the request, provide the previously received step-by-step directions via the user interface.

* * * * *